United States Patent
Marx et al.

(10) Patent No.: US 6,173,266 B1
(45) Date of Patent: Jan. 9, 2001

(54) SYSTEM AND METHOD FOR DEVELOPING INTERACTIVE SPEECH APPLICATIONS

(75) Inventors: Matthew T. Marx, Everett; Jerry K. Carter, Somerville; Michael S. Phillips, Belmont; Mark A. Holthouse, Newton; Stephen D. Seabury; Jose L. Elizondo-Cecenas, both of Boston; Brett D. Phaneuf, Marshfield, all of MA (US)

(73) Assignee: SpeechWorks International, Inc., Boston, MA (US)

( * ) Notice: Under 35 U.S.C. 154(b), the term of this patent shall be extended for 0 days.

(21) Appl. No.: 09/081,719

(22) Filed: May 6, 1998

Related U.S. Application Data

(60) Provisional application No. 60/045,741, filed on May 6, 1997.

(51) Int. Cl.[7] .................................................. G10L 11/00
(52) U.S. Cl. ........................................... 704/270; 704/272
(58) Field of Search .................................... 704/270, 272, 704/275, 231, 200, 276, 255, 256, 257

(56) References Cited

U.S. PATENT DOCUMENTS

| | | | |
|---|---|---|---|
| 4,625,081 | 11/1986 | Lotito et al. | 379/88 |
| 5,357,596 * | 10/1994 | Takebayashi et al. | 704/275 |
| 5,479,488 | 12/1995 | Lennig et al. | 379/67 |
| 5,544,305 * | 8/1996 | Ohmaye et al. | 395/161 |
| 5,566,272 | 10/1996 | Brems et al. | 395/2.4 |
| 5,594,638 | 1/1997 | Iliff | 395/203 |
| 5,615,296 * | 3/1997 | Stanford et al. | 704/201 |
| 5,638,425 | 6/1997 | Meador, III et al. | 379/88 |
| 5,652,789 | 7/1997 | Miner et al. | 379/201 |
| 5,694,558 * | 12/1997 | Sparks et al. | 395/236 |
| 5,774,860 * | 6/1998 | Bayya et al. | 704/275 |
| 5,842,193 * | 11/1998 | Reilly | 706/45 |
| 5,905,774 * | 5/1999 | Tatchell et al. | 379/88.04 |
| 6,035,275 * | 3/2000 | Brode et al. | 704/275 |
| 6,058,166 * | 5/2000 | Osder et al. | 379/88.22 |

OTHER PUBLICATIONS

AVIOS 1996 Presentation, Applied Language Technologies, Sep., 1996, pp. 1–11.

Marx, Matthew, "Rapid Development of Robust Speech Applications with DialogModules", AVIOS Conference Proceedings, Sep., 1996.

(List continued on next page.)

Primary Examiner—Richemond Dorvil
(74) Attorney, Agent, or Firm—Mintz, Levin, Cohn, Ferris, Glovsky and Popeo, P.C.

(57) ABSTRACT

Dialogue modules are provided, with each dialogue module includes computer readable instructions for accomplishing a predefined interactive dialogue task in an interactive speech application. In response to user input, a subset of the plurality of dialogue modules are selected to accomplish their respective interactive dialogue tasks in the interactive speech application and are interconnected in an order defining the call flow of the application, and the application is generated. A graphical user interface represents the stored plurality of dialogue modules as icons in a graphical display in which icons for the subset of dialogue modules are selected in the graphical display in response to user input, the icons for the subset of dialogue modules are graphically interconnected into a graphical representation of the call flow of the interactive speech application, and the interactive speech application is generated based upon the graphical representation. Using the graphical display, the method further includes associating configuration parameters with specific dialogue modules. Each configuration parameter causes a change in operation of the dialogue module when the interactive speech program executes. A window is displayed for setting the value of the configuration parameter in response to user input, when an icon for a dialogue module having an associated configuration parameter is selected.

25 Claims, 14 Drawing Sheets

OTHER PUBLICATIONS

Phillips, Mike, "Designing Successful Speech Recognition Applications", Computer Telephony Conference Exposition Seminar Manual, Mar. 12, 1996.

Davis, James Raymond, "Let Your Fingers Do the Spelling: Implicit Disambiguation of Words Spelled with the Telephone Keypad", Journal of the American Voice Input/Output Society, 9:57–66, Mar., 1991.

Kamm, Candace, "User Interfaces for Voice Applications", Voice Communication Between Humans and Machines, pp. 422–442, Washington, D.C., 1994.

Marx, Matthew Talin, "Toward Effective Conversational Messaging", MIT Master's Thesis, Program in Media Arts and Sciences, 1995.

Schmandt, Chris, "Phoneshell: The Telephone as Computer Terminal", Proceedings of ACM Multimedia Conference, Aug., 1993.

Pelton, Gordon E., "Development Software", Ch. 8 of Voice Processing, 1993, pp. 221–287.

Yankelovich, Nicole, et al., "SpeechActs: A Framework for Building Speech Application", 1994.

Yankelovich, Nicole, et al, "Designing SpeechActs" Issues in Speech User Interfaces, Proc. CHI, 1995.

Kamm, Candace, "User Interfaces for Voice Applications", from Voice Communication Between Humans and Machines, National Academy Press, 1994, pp. 422–442.

Ly, Eric, et al., "Chatter: A Conversational Learning Speech Interface", AAAI 1994 Spring Symposium on Multi–Media Multi–Modal Systems, Mar., 1994.

Marx, Matt, et al., "MailCall: Message Presentation and Navigation in a Nonvisual Environment".

Martin, Paul, et al., "SpeechActs: A Spoken–Language Framework", IEEE Computer, Jul., 1996, pp.33–40.

Scharf, Ira, "A Dialog Specification Language for Developing Interactive Speech Recognition Applications", pp. 49–68.

Zue, Victor W., "Development of Spoken Language Systems", IEEE Expert, 1993.

* cited by examiner

Error Recovery

Timeouts

| | |
|---|---|
| Timeout Period: | 5 seconds |
| Maximum Number: | 2 |
| Apology Prompts: | 1.<br>2.<br>3. |
| Reprompts: | 1.<br>2.<br>3. |

Recognition Error

| | |
|---|---|
| Maximum Number: | 2 |
| Apology Prompts: | 1.<br>2.<br>3. |
| Reprompts: | 1.<br>2.<br>3. |

Confirmation

| | |
|---|---|
| Confirmation Prompt: | |
| Apology Prompts: | 1.<br>2.<br>3. |
| Reprompts: | 1.<br>2.<br>3. |

Fallback

| | |
|---|---|
| Fallback: | |

Fig. 16

SYSTEM AND METHOD FOR DEVELOPING INTERACTIVE SPEECH APPLICATIONS

RELATED APPLICATIONS

This application claims priority from provisional application, U.S. Ser. No. 60/045,741, filed on May 6, 1997, which is incorporated herein by reference.

FIELD OF THE INVENTION

The present invention relates generally to a system and method for developing computer-executed interactive speech applications.

BACKGROUND

Computer-based interactive speech applications are designed to provide automated interactive communication, typically for use in telephone systems to answer incoming calls. Such applications can be designed to perform various tasks of ranging complexity including, for example, gathering information from callers, providing information to callers, and connecting callers with appropriate people within the telephone system. However, using past approaches, developing these applications has been difficult.

FIG. 1 shows a call flow of an illustrative interactive speech application 100 for use by a Company A to direct an incoming call. Application 100 is executed by a voice processing unit or PBX in a telephone system. The call flow is activated when the system receives a incoming call, and begins by outputting a greeting, "Welcome to Company A" (110).

The application then lists available options to the caller (120). In this example, the application outputs an audible speech signal to the caller by, for example, playing a prerecorded prompt or using a speech generator such as text-to-speech converter: "If you know the name of the person you wish to speak to, please say the first name followed by the last name now. If you would like to speak to an operator, please say 'Operator' now."

The application then waits for a response from the caller (130) and processes the response when received (140). If the caller says, for example, "Mike Smith," the application must be able to recognize what the caller said and determine whether there is a Mike Smith to whom it can transfer the call. Robust systems should recognize common variations and permutations of names. For example, the application of FIG. 1 may identify members of a list of employees of Company A by their full names—for example, "Michael Smith." However, the application should also recognize that a caller asking for "Mike Smith" (assuming there is only one employee listed that could match that name) should also be connected to the employee listed as "Michael Smith."

Assuming the application finds such a person, the application outputs a confirming prompt: "Do you mean 'Michael Smith'?" (150). The application once again waits to receive a response from the caller (160) and when received (170), takes appropriate action (180). In this example, if the caller responded "Yes," the application might say "Thank you. Please hold while I transfer your call to Michael Smith," before taking the appropriate steps to transfer the call.

FIG. 2 shows some of the steps that are performed for each interactive step of the interactive application of FIG. 1. Specifically, applying the process of FIG. 2 to the first interaction of the application described in FIG. 1, the interactive speech application outputs the prompt of step 120 of FIG. 1 (210). The application then waits for the caller's response (220, 130). This step should be implemented not only to process a received response, as shown in the example of FIG. 1 (140), but also to handle a lack of response. For example, if no response is received within a predetermined time, the application can be implemented to "time out" (230) and reprompt the caller (step 215) with an appropriate prompt such as "I'm sorry, I didn't hear your response. Please repeat your answer now," and return to waiting for the caller's response (220, 130).

When the application detects a response from the caller (240), step 140 of FIG. 1 attempts to recognize the caller's speech, which typically involves recording the waveform of caller's speech, determining a phonetic representation for the speech waveform, and matching the phonetic representation with an entry in a database of recognized vocabulary. If the application cannot determine any hypothesis for a possible match (250), it reprompts the caller (215) and returns to waiting for the caller's response (220). Generally, the reprompt is varied at different points in the call flow of the application. For example, in contrast to the reprompt when no response is received during the time out interval, the reprompt when a caller's response is received but not matched with a recognized response may be "I'm sorry, I didn't understand your response. Please repeat the name of the person to whom you wish to speak, or say 'Operator.'"

If the application comes up with one or more hypotheses of what the caller said (260, 270), it determines a confidence parameter for each hypothesis, reflecting the likelihood that it is correct. FIG. 2 shows that the interpretation step (280) may be applied for both low confidence and high confidence hypotheses. For example, if the confidence level falls within a range determined to be "high" (step 260), an application may be implemented to perform the appropriate action (290, 180) without going through the confirmation process (150, 160, 170). Alternatively, an application can be implemented to use the confirmation process for both low and high confidence hypotheses. For example, the application of FIG. 1 identifies the best hypothesis to the caller and asks whether it is correct.

If the application interprets the hypothesis to be incorrect (for example, if the caller responds "No" to the confirmation prompt of step 150), the application rejects the hypothesis and reprompts the caller to repeat his or her response (step 215). If the application interprets the hypothesis to be correct (for example, if the caller responds affirmatively to the verification prompt), the application accepts the hypothesis and takes appropriate action (290), which in the example of FIG. 1, would be to output the prompt of 180 and transfer the caller to Michael Smith.

As exemplified by application 100 of FIGS. 1 and 2, interactive speech applications idare complex. Implementing an interactive speech application such as that described with reference to FIGS. 1 and 2 using past application development tools requires a developer to design the entire call flow of the application, including defining vocabularies to be recognized by the application in response to each prompt of the application. In some cases, vocabulary implementation can require the use of an additional application such as a database application. In the past approaches, it has been time consuming and complicated for the developer to ensure compatibility between the interactive speech application and any external applications and data it accesses.

Furthermore, the developer must design the call flow to account for different types of responses for the same prompt in an application. In general, past approaches require that the developer define a language model of the language to be recognized, typically including grammar rules to generally define the language and to more specifically define the intended call flow of the interactive conversation to be carried on with callers. Such definition is tedious.

Because of the inevitable ambiguities and errors in understanding speech, an application developer also needs to provide error recovery capabilities, including error handling and error prevention, to gracefully handle speech ambiguities and errors without frustrating callers. This requires the application developer not only to provide as reliable a speech recognition system as possible, but also to design alternative methods for successfully eliciting and processing the desired information from callers. Such alternative methods may include designing helpful prompts to address specific situations and implementing different methods for a caller to respond, such as allowing callers to spell their responses or input their responses using the keypad of a touch-tone phone. In past approaches, an application developer is required to manually prepare error handling, error prevention, and any alternative methods used in them. This is time consuming and may lead to omissions of functions or critical steps.

Based on the foregoing, there is a clear need in this field for an interactive speech development system and method that overcome these shortcomings.

SUMMARY

In general, in one aspect, the invention features a computer-implemented method of constructing an interactive speech application by storing a plurality of dialogue modules in a speech processing system, wherein each dialogue module includes computer readable instructions for accomplishing a predefined interactive dialogue task in an interactive speech application. In response to user input, a subset of the plurality of dialogue modules are selected to accomplish their respective interactive dialogue tasks in the interactive speech application and are interconnected in an order defining the call flow of the application, and the application is generated.

Certain implementations may include one or more of the following features. The method may further include associating with specific dialogue modules, configuration parameters that change the operation of the dialogue module when the interactive speech program executes. The configuration parameters may be set in response to user input.

The interactive dialogue task associated with a dialogue module includes outputting a prompt to a caller and receiving a response from the caller. Examples of configuration parameters include: a timeout parameter defining a period for the caller to respond after a prompt is output; a prompt parameter defining a prompt to be output; an apology prompt parameter for defining an apology prompt to be output if the caller's response is not recognized; and a parameter for identifying a vocabulary defining recognizable responses from the caller. The method may further include editing the vocabulary in response to user input.

The interactive dialogue task associated with a dialogue module includes instructions for outputting a prompt to a caller, instructions for receiving a response from the caller, and instructions for interacting with a speech recognition engine for recognizing the received response using recognition models, and further may include instructions for updating the recognition models used by the speech recognition engine based on recognized responses during execution of the interactive speech application.

The method further includes graphically representing the stored plurality of dialogue modules as icons in a graphical display, in which icons for the subset of dialogue modules are selected in the graphical display in response to user input, the icons for the subset of dialogue modules are graphically interconnected into a graphical representation of the call flow of the interactive speech application, and the interactive speech application is generated based upon the graphical representation. Using the graphical display, the method further includes associating configuration parameters with specific dialogue modules. Each configuration parameter causes a change in operation of the dialogue module when the interactive speech program executes. A window is displayed for setting the value of the configuration parameter in response to user input, when an icon for a dialogue module having an associated configuration parameter is selected.

In general, in another aspect, the invention features a memory device storing computer-readable instructions for constructing an interactive speech application in a speech processing system according to the method described above.

Among the advantages of the invention are one or more of the following. The present invention provides prepackaged software modules each representing a discrete dialogue task for use in an interactive speech application. Because each of these "Dialogue Modules" performs a discrete task, they are largely independent, giving the application developer great flexibility in create a custom application by simply combining Dialogue Modules together in the order of the desired call flow of an application. In addition, because they are task-specific, Dialogue Modules can be optimized to provide the highest possible recognition accuracy and task completion rates through tuned semantic, language, and acoustic models.

By providing Dialogue Module templates in pre-packaged modules, the invention can be used to create applications that have internally consistent software code, which is especially important in larger applications with complex call flows.

Dialogue Module templates have customizable parameters, which provide developers with a high degree of flexibility in customizing an application. For example, although Dialogue Modules may be implemented to provide prerecorded "default" prompts to the caller, the developer may customize the prompts for specific applications. Other customizable features include whether to enable features such as a "barge-in" feature to recognize a caller's speech while the application prompt is running, selecting appropriate error handling methods and prompts, and modifying or creating a database of recognized vocabulary.

The invention enables developers to create interactive speech applications to conduct automated conversations with callers, even if the developers have no formal speech training.

BRIEF DESCRIPTION OF THE DRAWINGS

FIGS. 9–16 illustrate Graphical User Interfaces (GUIs) for creating and editing an interactive speech application.

DETAILED DESCRIPTION

In the following description of a method and system for developing interactive speech application, for purposes of explanation, numerous specific details are set forth to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

I. Overview of a System for Developing Interactive Speech Applications

Figure 3:
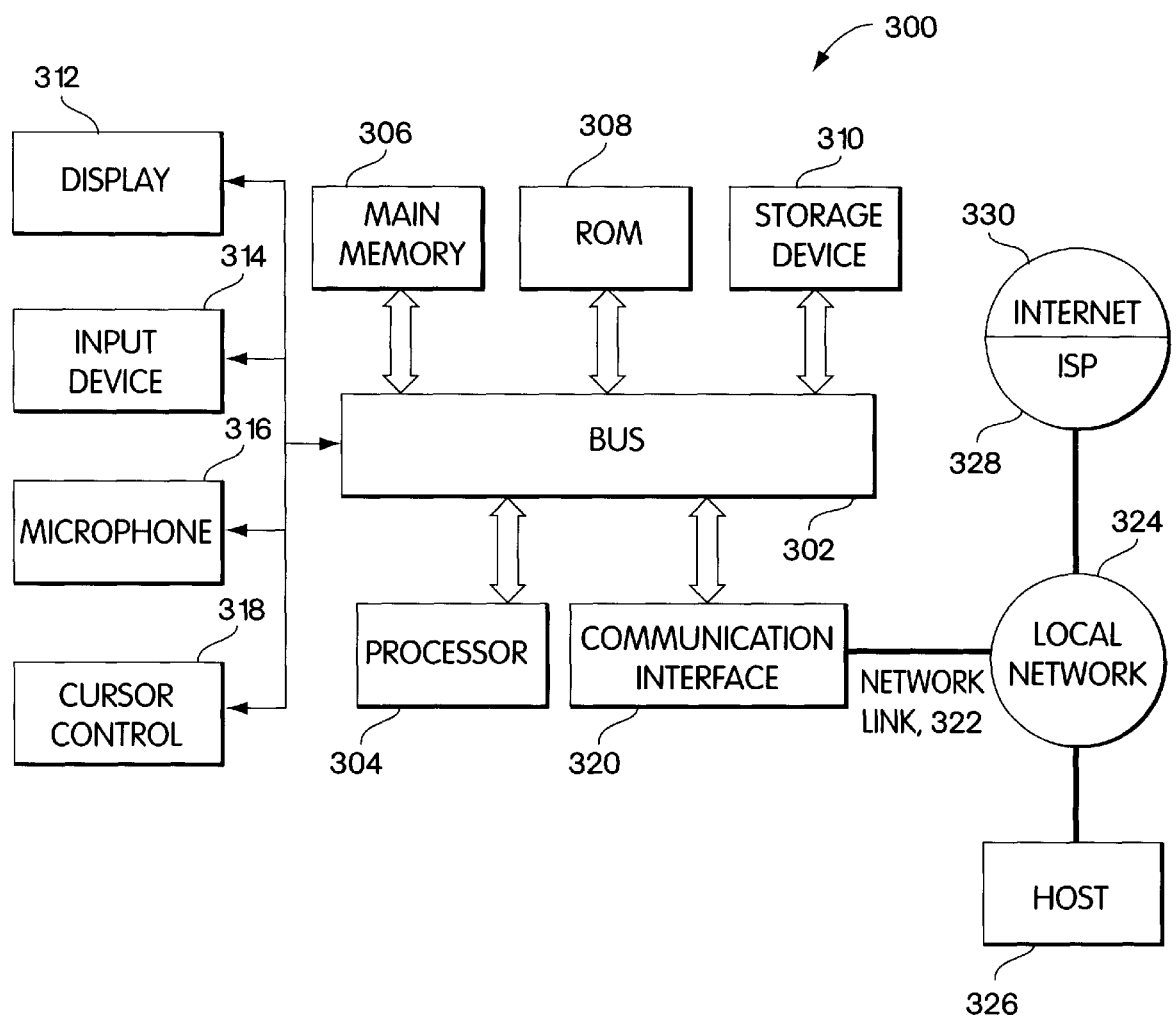
FIG. 3 is a block diagram of a computer system on which interactive speech applications may be implemented.

The invention is related to the use of a computer system for developing interactive speech applications. FIG. 3 is a block diagram that illustrates such a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 also includes output devices such as a display 312 coupled to bus 302 for displaying information to a computer user. Input devices coupled to bus 302 for communicating information and command selections to processor 304 may include a keyboard 314, a microphone 316, and a cursor control device 318, such as a mouse, a trackball, or cursor direction keys for communicating direction information and command selections to processor 304 and for controlling cursor movement on display 312.

Computer system 300 also includes a communication interface 320 coupled to bus 302, providing coupling to external computer systems or networks. For example, as shown in FIG. 3, communication interface 320 provides a two-way data communication coupling to a network link 322 that is connected to a local network 324. For example, communication interface 320 may be an integrated services digital network (ISDN) card or a modem to provide a data communication connection 322 to a corresponding type of telephone network lines 324. As other examples, communication interface 320 may be a telephony interface/voice board to provide voice and data communication connections 322 over telephone network lines 324, or may be a local area network (LAN) card to provide a data communication connection 322 to a compatible LAN 324. Wireless links may also be implemented. In any such implementation, communication interface 320 sends and receives electrical, electromagnetic or optical signals that carry digital data streams representing various types of information.

Network link 322 typically provides data communication through one or more networks to other data devices. For example, network link 322 may provide a connection through local network 324 to a host computer 326 or to data equipment operated by an Internet Service Provider (ISP) 328. ISP 328 in turn provides data communication services through the world wide packet data communication network now commonly referred to as the "Internet" 330.

Additional details of exemplary components of a computer system suitable for speech systems are described in G. Pelton, "Voice Processing" (New York: McGraw-Hill, 1993), ISBN 0-07-049309-X, Chapter 8 ("Development Software").

According to one embodiment of the invention, an interactive speech application is developed and executed using software running on a general purpose computer system such as computer system 300. In alternative embodiments, special purpose hardware may be used in place of or in combination with software instructions to implement the invention. Thus, embodiments of the invention are not limited to any specific combination of hardware circuitry and software.

Figure 4:
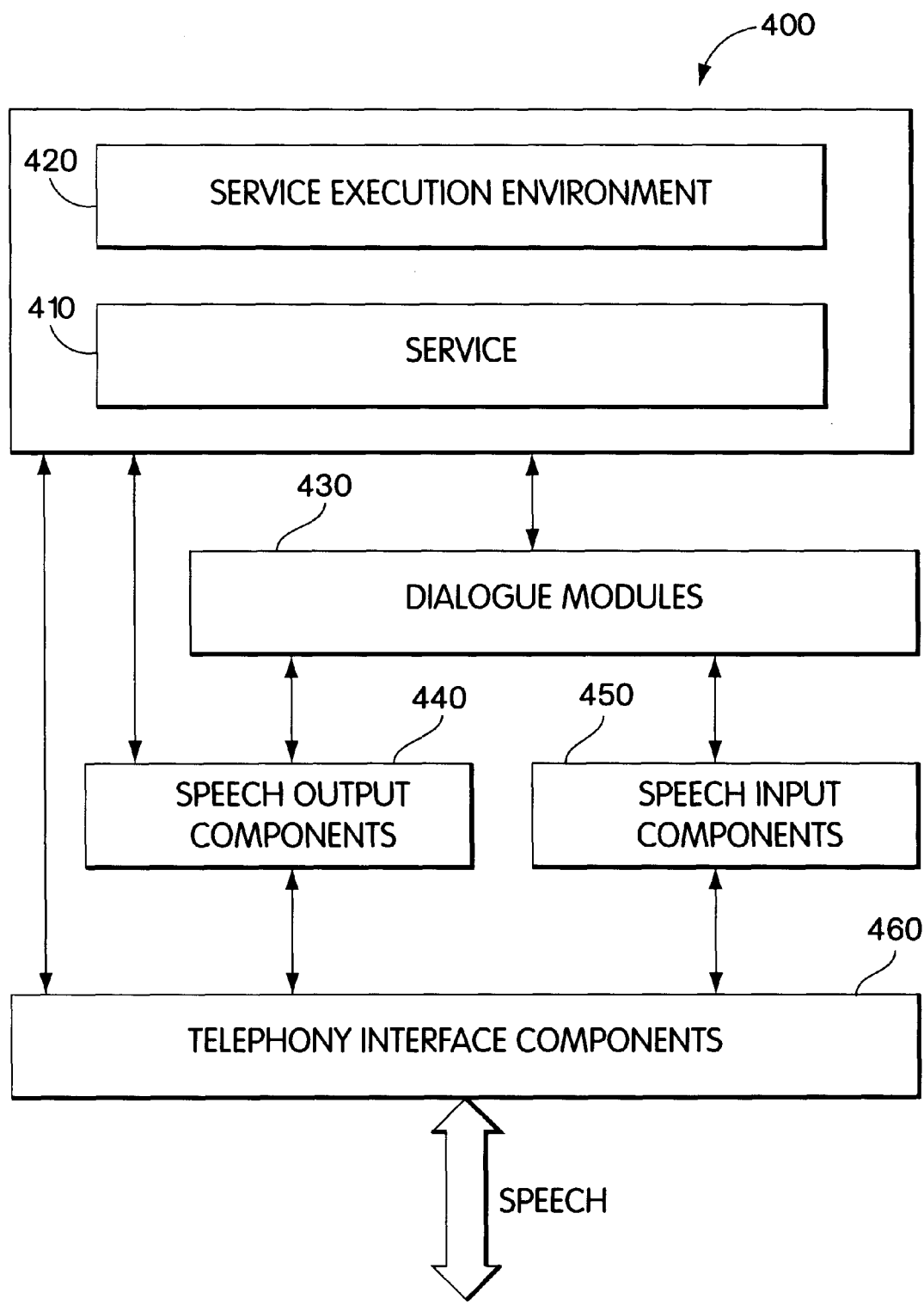
FIG. 4 is a logical block diagram of a system suitable for developing interactive speech applications.

FIG. 4 is a functional block diagram of a system 400 for developing interactive speech applications. As used herein, a "Service" 410 is a customized interactive speech application developed to perform one or more dialogue tasks to provide a user-defined service. An example of a Service is the application described above with reference to FIGS. 1 and 2 for receiving and routing an incoming call to Company A.

An application developer creates a Service 410 defining a call flow in a runtime Service Execution Environment 420 which may be a default environment provided to the developer or a customized environment created or modified for the specific Service 410. In this embodiment, the Service Execution Environment 420 provides the "main()" function that executes the Service 410, which is configured as a dynamically linked library (dll).

The call flow of the Service 410 describes its interactive conversation with callers using function calls to one or more "instances" of software Dialogue Modules from the Dialogue Modules 430. The system 400 comprises a plurality of Dialogue Modules, each designed for performing a specific dialogue task such as outputting a prompt, identifying the caller's speech as a recognized item of a predefined list, identifying the caller's speech as an affirmative or negative (Yes/No) response, or identifying strings of characters spelled by the caller. In the embodiments described herein, each Dialogue Module template is a function, method, object, or subroutine in a programming language such as C++, although a variety of different programming languages may be used.

A developer uses the Dialogue Modules to perform their respective dialogue tasks in a Service 410. Each Dialogue Module may use default configuration parameters or may be customized for specific Services. Parameters of a Dialogue Module instance may be customized to, for example, output customized prompts, recognize customized vocabularies in response to prompts, enable or disable specific features, and set a variety of additional parameters.

Dialogue Modules 430 provides an interface between the Service 410 and the Speech Components 440, 450, which perform functions enabling the system 400 to handle output and input audio signals. By providing the interface, the Dialogue Modules 430 allows a developer to develop a Service 410 without a detailed understanding of the Speech Components 440, 450, whose functions include outputting prompts to callers and receiving and processing input speech from callers. Any number of Speech Components 440, 450 may be included in the system 400.

In the embodiment illustrated in FIG. 4, the Speech Output Components 440 output speech prompts (or other audio signals) through the Telephony Interface Components 460. In some cases, the Speech Output Components 440 may simply execute a specified audio file to output prerecorded speech. Alternatively, the Speech Output Components 440 may include a speech synthesis system, such as DECtalk™, a text-to-speech synthesizer that is available from Digital Equipment Corporation for converting text to speech. Commercially available speech synthesizers typically include a pronunciation dictionary and a speech generator to interpret an input text string, determine a pronunciation, and generate and output a speech waveform. Additionally, Speech Output Components 440 may include software to output an audio signal such as a beep when the prompt is finished playing, intended to notify callers that they should begin speaking. The Speech Output Components 440 may also include software to stop the output of a prompt if caller speech is detected to provide "barge-in" detection and handling. Details of barge-in detection and handling are explained, for example, in U.S. Ser. No. 08/651,889, entitled "Method and Apparatus for Facilitating Speech Barge-In In Connection With Voice Recognition Systems," which is commonly assigned to the assignee of the present application.

The Speech Input Components 450 receive, record, and process incoming speech signals received through the Telephony Interface Components 460 during execution of a Service. Speech Input Components 450 typically include a Speech Recognition Engine such as that provided in SpeechWorks™, available from Applied Language Technologies, Inc. of Boston, Mass., for recording, digitizing, and processing speech input. The Speech Recognition Engine, using additional components such as acoustic models for determining a phonetic representation of an input spoken word, database components for determining possible matches to entries in specified databases accessible to the Engine, and confidence correlation components for determining the confidence in hypotheses of possible matches, generates a textual representation of incoming speech signals received from callers. The Engine has natural language modeling information, such as grammar rules of languages of speech it is intended to recognize.

The Telephony Interface Components 460 include components such as telephony cards providing telephony interface/voice boards for communicating over telephone lines, call channels for handling multiple calls on the telephone lines, an audio player/recorder for outputting prompts to callers and recording incoming speech from callers, and other components as needed to output and receive speech signals to and from callers, as well as software libraries to control the components.

The Service 410, including its Dialogue Module instances and their underlying Speech Components 440, 450 and Telephony Interface Components 460, operates within the runtime Service Execution Environment 420. As noted above, in this embodiment, the Service 410 is configured as a dynamically linked library (dll) and is executed by being called by the Service Execution Environment 420 which provides the "main()" function. Additional software code is provided in a library to handle calls to Dialogue Module instances and other globally used functions.

In general, the Service Execution Environment 420 will invoke the Service 410 at three times: service initialization, service execution (processing incoming calls), and service clean up (after processing calls). Examples of functions the Service Execution Environment 420 can be configured to process include:

- initializing the telephony interface;
- initializing the interfaces to the Speech Components 440, 450 and Dialogue Modules 430;
- invoking user-provided service initialization routines, if necessary;
- waiting for an incoming call;
- determining a telephony channel;
- invoking user-provided service execution routines;
- ensuring disconnection of completed calls; and
- invoking cleanup routines, including user-provided service cleanup routines, Dialogue Module cleanup routines, and hardware/telephony resources cleanup routines.

II. Dialogue Modules

Interactive speech applications typically include a series of discrete dialogue tasks—requesting specific types of information from callers and processing the callers' responses. Dialogue Modules are predefined software components for performing these dialogue tasks within an application. Each Dialogue Module performs a discrete task and saves its results, including a value indicating its termination condition. For example, termination conditions can include SUCCESS, indicating a successful completion of a dialogue task, TIMEOUT, indicating that the caller did not respond within a predefined timeout period, or ERROR, indicating that the system could not recognize the caller's response.

As noted above and illustrated in FIG. 4, the Dialogue Modules 430 provide an interface between the Service 410 and Speech Components 440, 450, allowing developers to develop applications without a detailed understanding of speech technology. A Service 410 includes a series of calls to Dialogue Modules 430, ordered to produce the desired call flow and customized for the intended use of the specific Service 410. The Dialogue Modules 430, in turn, handle interaction with callers through the Speech Components 440, 450 and the Telephony Interface Components 460.

As used herein, Dialogue Module "templates" are predefined software modules that act as the building blocks for interactive speech applications, and Dialogue Module "instances" are versions of the templates as they are used in specific Services. A Dialogue Module instance may be identical to the template upon which it is based, or may be customized for a specific Service. Instances may be labeled with unique identifiers, allowing more than one instance of a Dialogue Module template to be used within a single Service.

Figure 5:
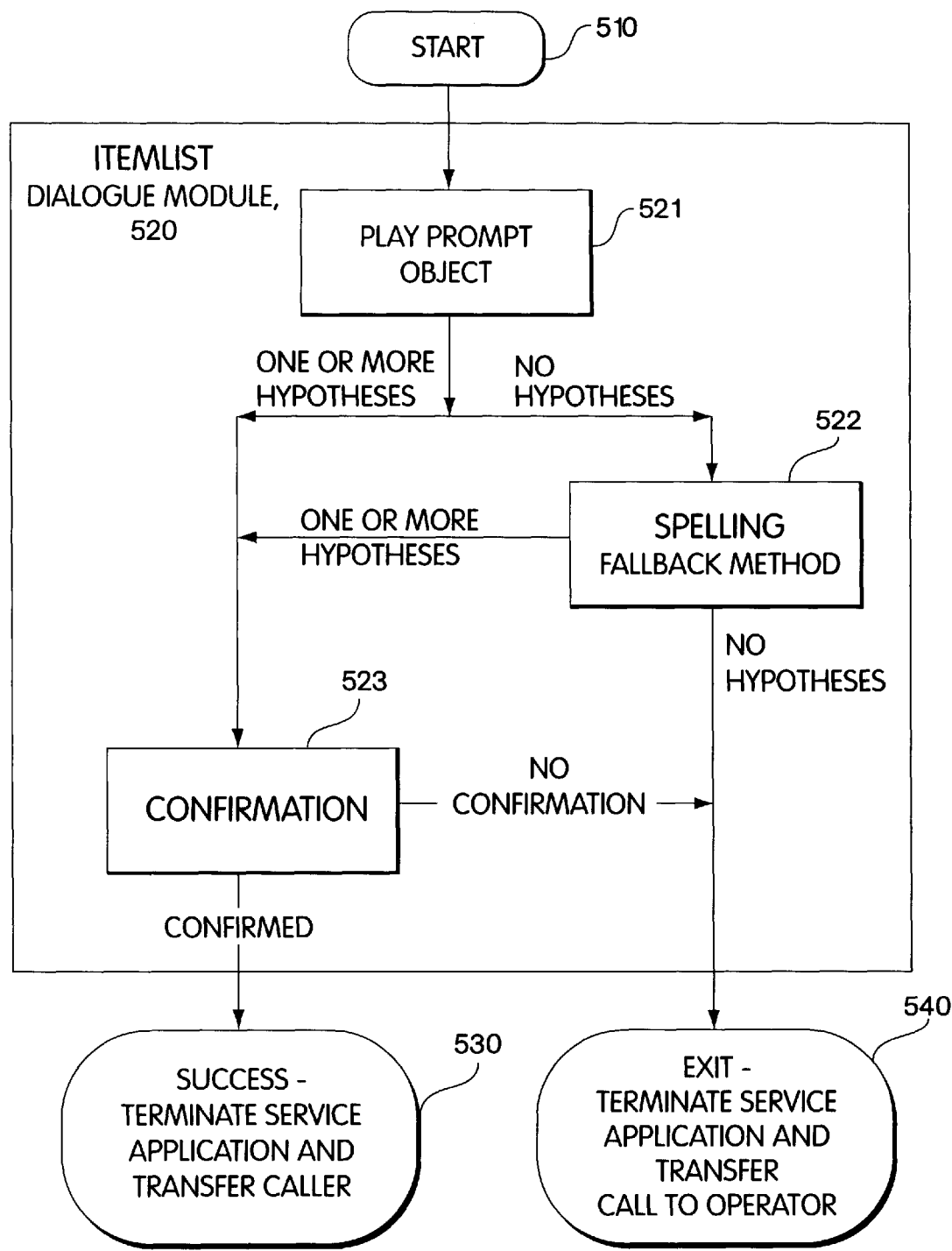
FIG. 5 is a flow chart illustrating an interactive speech application including Dialogue Module instances.

FIG. 5 is a flow diagram of an example of a Service 410 implemented using a system 400 such as that illustrated in FIG. 4 and having a call flow as described above with reference to FIGS. 1 and 2. The Service 410 begins 510 by calling an ItemList Dialogue Module instance 520, whose task is to identify a person to whom a caller wishes to speak. The ItemList Module 520 begins by playing a prompt object 521, which in this example, uses the Speech Output Components 440 and Telephony Interface Components 460 to output a speech signal for the customized prompts shown by blocks 110 and 120 in FIG. 1 and receiving the caller's voice response.

Figure 1:
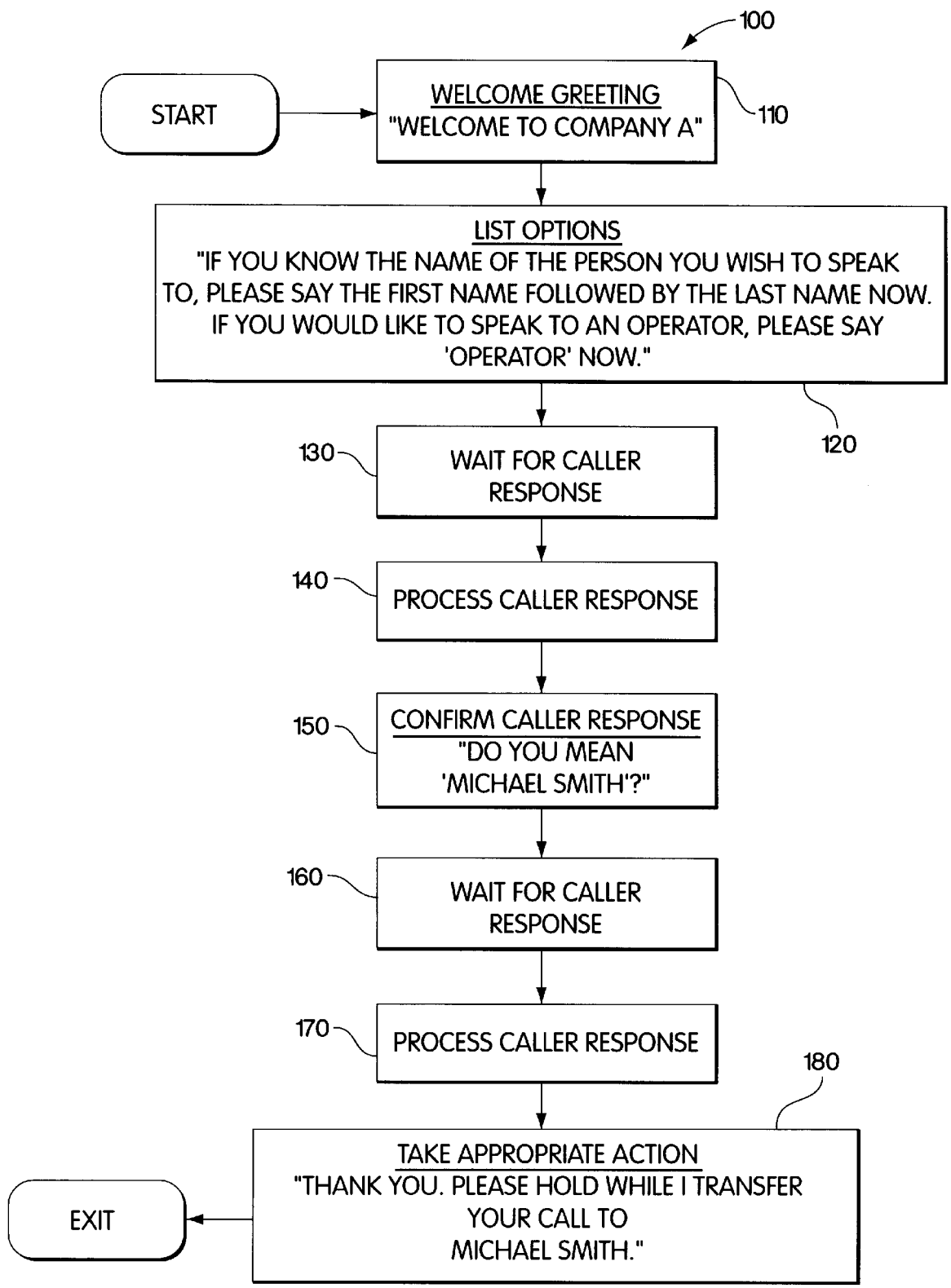
FIG. 1 is a flow chart of a call flow of an interactive speech application.
Figure 2:
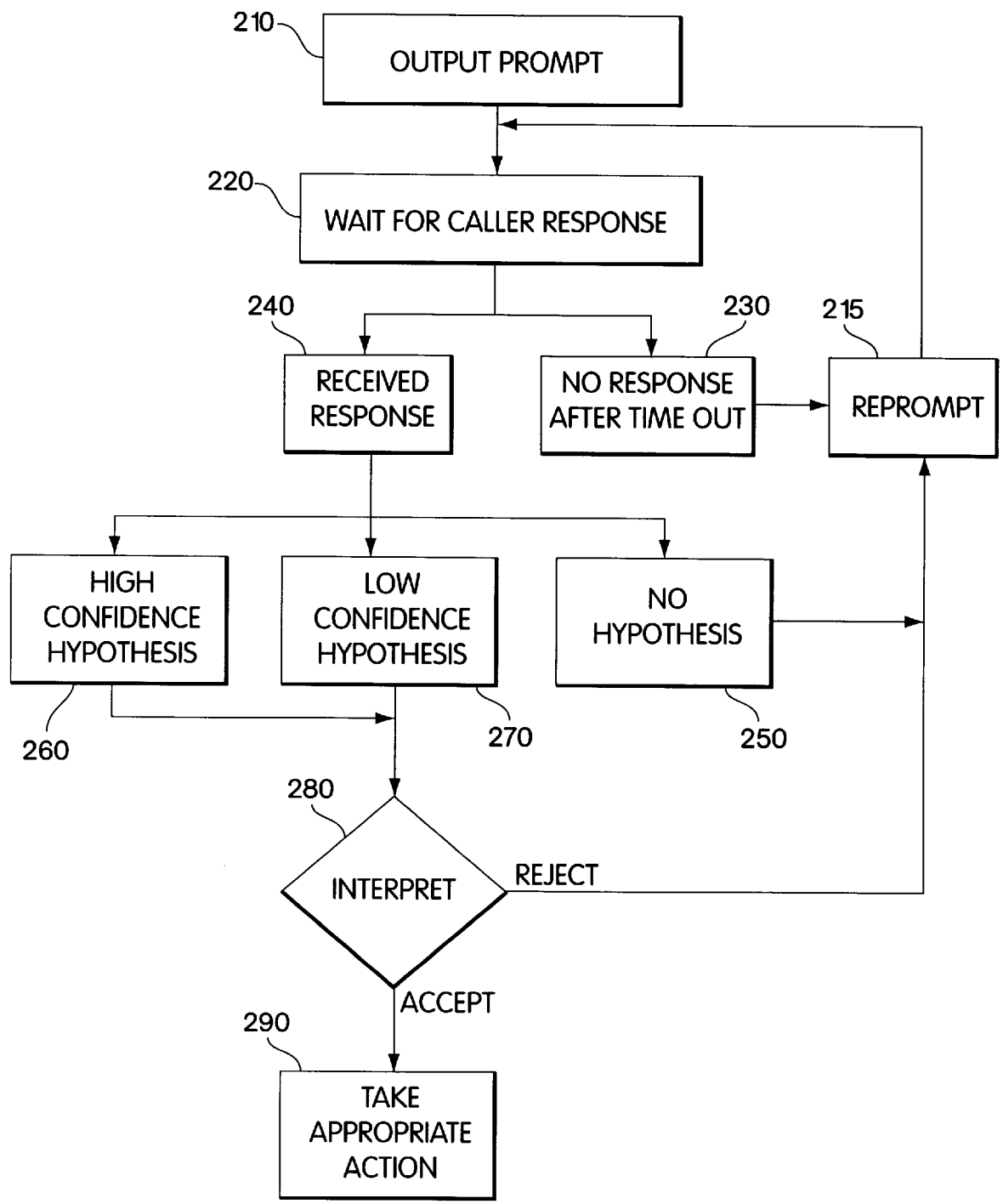
FIG. 2 is a flow chart of an interactive step in an interactive speech application.

ItemList Module 520 accesses a customized recognized vocabulary having entries that identify people recognized by the Service 410. In the example of FIG. 1, the recognized vocabulary corresponds to employees of Company A along with an operator and/or names of departments (e.g., sales, customer service, etc.). This customized vocabulary will typically be implemented by the application developer to recognize an employee not only by full name, but also by other names by which the employee could be recognized, such as just a last name, just a first name, or a nickname, perhaps combined with a last name. For example, if an employee is named Michael A. Smith, the database should recognize not only "Michael Smith," but also other names by which a caller is likely to identify that employee, such as "Mike Smith," "Michael," "Mike," and "Smith." Such a vocabulary can be created using programs such as the Vocabulary Editor described below, or other appropriate data management applications.

In the confirmation step represented by block 523, the ItemList Module 520 identifies zero or more vocabulary entries as hypotheses of the person sought by the caller based on confidence levels determined by the Speech Input Components 450. In this embodiment, if the hypothesis having the highest confidence level has a confidence level exceeding a predefined threshold, the ItemList Module 520 assumes that hypothesis is the correct match for the caller's response. If no such hypothesis exists, the ItemList Module 520 determines hypotheses having confidence levels falling within a predefined range, indicating possible matches. The ItemList Module 520 sequentially outputs prompts for these hypotheses until a hypothesis is confirmed or the list of hypotheses is exhausted. More specifically, the confirmation step 523 receives and processes the caller's response to determine whether the response was affirmative or negative.

Processing the caller's response requires that the ItemList Module be able to understand and identify a variety of responses as affirmative or negative, including not only "yes" and "no", but also synonyms such as "correct," "incorrect," "right," "wrong," etc. Thus, the ItemList Module 520 also uses a recognized vocabulary for the confirmation step, having entries for recognized responses to the confirmation step, including information for each entry, indicating whether it represents an affirmative or a negative response.

Unlike the highly Service-specific recognized vocabulary used by the ItemList Module 520 to identify Company A employees, the recognized vocabulary of the confirmation step 523 is likely to be common in Services. Thus, the confirmation step 523 may be implemented to use a predefined default vocabulary that includes standard responses as entries. As explained below, however, if desired, the default database can be customized or replaced by the application developer for use with a specific Service. For example, in geographic areas with a Spanish-speaking population, Spanish vocabulary may be added to the database entries corresponding to affirmative responses.

If the ItemList Module 520 determines that the confirmation step 523 confused a hypothesis, it saves the hypothesis and Termination Condition (SUCCESS) and returns to the main function of the Service to transfer the call to the identified person 530. If the ItemList Module 520 determines that the confirmation step 523 does not confirm the hypothesis or terminated on a TIMEOUT or ERROR condition, the ItemList Module 520 may reattempt to complete its task (repeating the cycle beginning with block 521, outputting a prompt and receiving and processing a response). Alternatively, the ItemList Module 520 can terminate on an ERROR condition 540 and take appropriate termination actions. In this example, a likely action would be to transfer the caller to a live operator.

Although not shown in FIG. 1, a Dialogue Module may include alternative fallback methods for performing the dialogue task when it is unable to recognize or is unsure of the caller's response. Examples of such methods are asking the caller to spell his or her response, or to enter the response using the keyboard of a touchtone phone. In the Service 410 represented by FIG. 5, the ItemList Dialogue Module instance 520 provides a spelling fallback 522 to callers.

After a predetermined number (which may be a default value, or a value set by the developer) of unsuccessful attempts to understand the caller during execution of the Service 410, the ItemList Module 520 uses a Spelling fallback method 522 to determine an entry in a vocabulary based on spelling received from the caller. In this example, the Spelling fallback method 522 uses the same recognition vocabulary used by the ItemList Module 520 and prompts the caller to spell the full name of the person to whom he or she wishes to speaks, first name followed by last name. The Spelling fallback method 522 searches the recognition vocabulary as it receives and converts each character of the caller's spelling.

The Spelling fallback method 522 is implemented to include a "look-ahead" feature, which is explained, for example, in copending application U.S. Ser. No. 08/720,554, entitled "Method and Apparatus for Continuous Spelling Speech Recognition with Early Identification," which is commonly assigned to the assignee of the present application. Using the look-ahead feature, the Spelling fallback method 522 will terminate successfully as soon as it has identified a unique match between the characters spoken by the caller with an entry in the vocabulary, even if the caller has not completed spelling the entire word or phrase. If the Spelling fallback method 522 successfully identifies at least one entry, it saves the results and continues to the confirmation step 523, explained above.

If the Spelling fallback method 522 does not identify a person, it saves a TIMEOUT or ERROR Termination Condition, as appropriate, and Exits 540. The action to take in case of error may be customized for various Services. As noted above, in the example of FIGS. 1 and 2, a likely termination action would be to transfer the caller to a live operator.

A. Common Features Of Dialogue Modules

The Dialogue Modules and the tasks they perform are of varying complexity and flexibility, ranging from simple, single-step modules to complex, multi-step modules. An example of a single-step module is a Yes I No Module that outputs a prompt and determines whether the caller's response is affirmative or negative. In contrast, an example of a multi-step module is one that requests an address from a caller. Such a module converts the caller's speech to text, and also correlates specific spoken words or phrases with specific fields of information, such as street name, city, state, and zip code.

Figure 6:
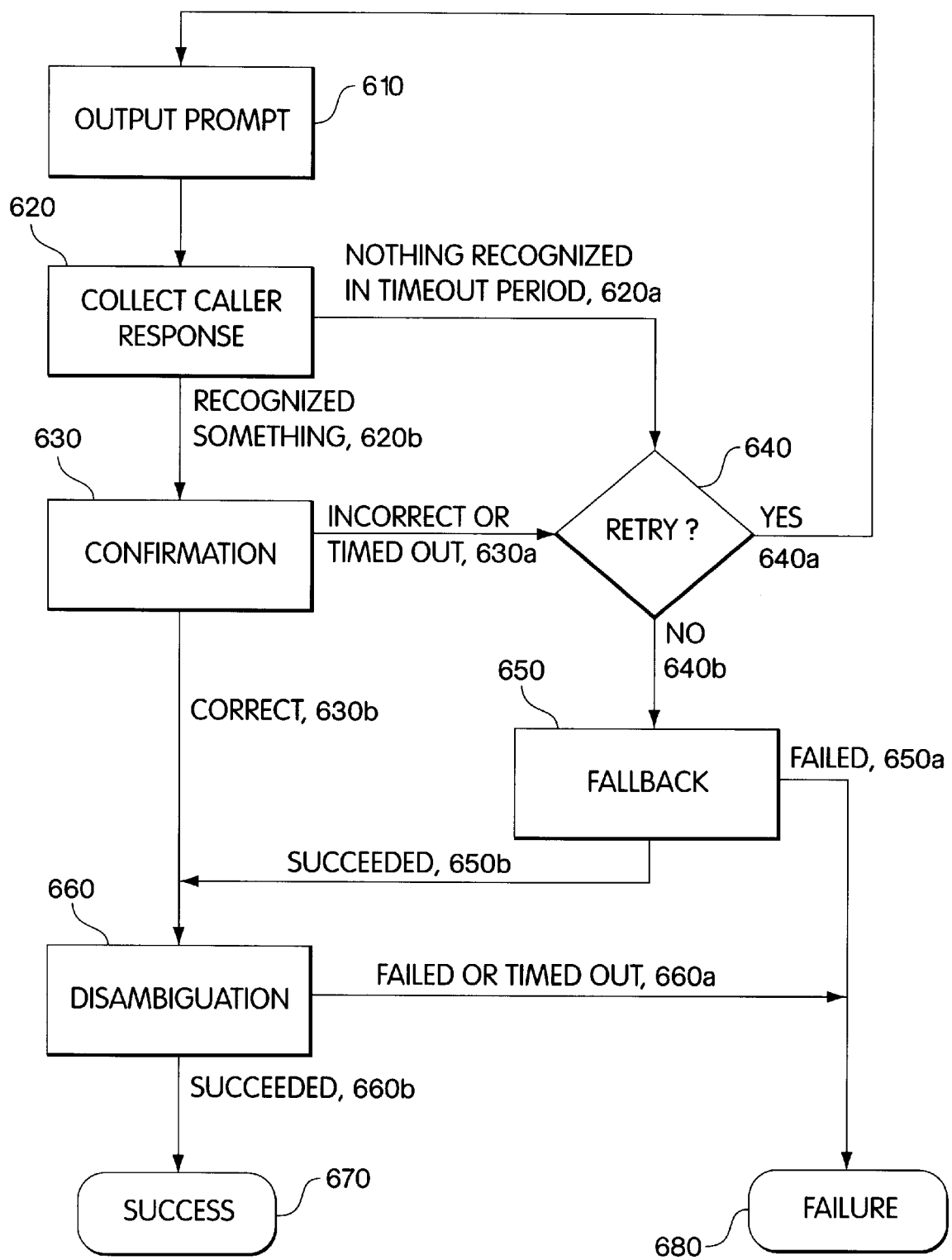
FIG. 6 is a flow chart of steps performed by a Dialogue Module.

While each Dialogue Module template handles a different dialogue task, the templates generally include common features to complete its dialogue task or exit gracefully. FIG. 6 is a block diagram of some of these features, including prompting, collecting caller responses, optionally confirming caller responses, providing fallback methods for correctly recognizing caller responses, and disambiguating caller responses when necessary.

1. Initial Prompt

Most Dialogue Modules perform an interactive dialogue task that involves requesting and processing information from callers, and therefore include an initial prompt as shown in block 610, requesting the caller to speak the desired information. For example, the ItemList Module 530 of the Service described with reference to FIGS. 1, 2, and 5 uses an initial prompt that asks the caller to say the name of the person to whom the caller wishes to speak.

2. Collecting a Response

The collection step of block 620 is the second half of an interactive task—namely, receiving the caller's response. Dialogue Modules collect responses by recording waveforms of the caller's speech. To avoid causing the caller to wait indefinitely, this step generally has a "timeout" parameter that sets a predetermined time period for the caller to respond after the output of a prompt. Thus, there are two possible results: recognizing a received response, or not recognizing any response within the timeout period, as respectively indicated by control paths 620*b* and 620*a*.

Customizable features are provided in the collection step. For example, as explained below, the timeout period can be set to different lengths of time. Additionally, a beep-after-prompt feature can be enabled to output a beep (or any of a variety of other sounds) after a prompt is output when the timeout period begins (to signal the caller to speak). Similarly, a sound feature can be enabled to output sounds (such as percolation noises) after a caller has finished speaking a response to let the caller know that the system is processing the response. Another feature, "barge-in" handling can be enabled to allow the collection step to detect and collect caller responses received before the preceding prompt has been completely output, and parameters such as the barge-in threshold can be set to determine when the barge-in features is used. As explained below, each of these parameters may be set by default values, or may be customized by the application developer.

3. Confirming the Response

If a response is received within the timeout period, a Dialogue Module attempts to confirm that it has correctly recognized the caller's response as shown by block 630. In this embodiment, the confirmation step 630 involves attempting to find a matching entry in a specified recognized vocabulary for the recorded waveform using the Input Speech Components 450. As noted above, in this embodiment, the Input Speech Components 450 include a Speech Recognition Engine that determines one or more hypotheses for a match and generates a score reflecting a confidence level for each hypothesis based on models such as semantic, language, and acoustic models. In one embodiment, the confirmation step 630 sequentially outputs confirmation prompts for each hypothesis, asking the caller to confirm whether a given hypothesis is correct, until a hypothesis is confirmed or until all of the hypotheses have been rejected.

The specified recognized vocabulary may be a default vocabulary or may be customized for a specific Service. For example, a Dialogue Module template such as the Yes/No Module may prompt the caller for responses that tend to be the same even in different Services. Such templates will typically be implemented to use a standard default vocabulary, although the vocabulary used by instances of these templates may be customized or changed by the developer. Other Dialogue Modules, such as the ItemList Module, will generally require customized vocabularies created for specific Services. As explained in greater detail below, a developer can create a customized vocabulary using an editing tool during development of a Service. Alternatively, an existing vocabulary can be dynamically updated during Service execution through a runtime application programming interface using technology such as that disclosed in copending application U.S. Ser. No. 08/943, 557, entitled "Method And Apparatus For Dynamic Adaptation Of A Large Vocabulary Speech Recognition System And For Us Of Constraints From A Database In A Large Vocabulary Speech Recognition System," which is commonly assigned to the assignee of the present application.

The confirmation step 630 uses a variety of factors to determine which, if any, of the vocabulary entries should be considered as hypotheses accurately representing the caller's response. Such factors include the confidence level generated by the Speech Recognition Engine of the Speech Input Components 450, a value for "n", the maximum number of hypotheses to consider (the n-best hypotheses), and prior recognition information.

More specifically, the confirmation step 630 will determine a confidence score for each vocabulary entry as a recognition hypothesis for a caller's response. As suggested in FIG. 2, predefined threshold levels can be set to categorize confidence scores into high confidence, low confidence, or no confidence levels. These threshold levels can be varied, and determine which vocabulary entries the Recognition Engine will consider as hypotheses.

Another factor considered by the confirmation step 630 is the value for "n," which may be set to a default or customized value. The Recognition Engine uses this value to limit its consideration to the n-best hypotheses.

The Dialogue Module also retains information about prior recognition attempts for a given interactive session to adapt later recognition attempts to selectively screen out previously rejected hypotheses and to selectively consider repeated low-confidence hypotheses.

More specifically, if, during a first iteration of the cycle defined by blocks 610, 620, 630, and 640, the confirmation step 630 considers n-hypotheses, all of which are rejected as incorrect by the caller, in the next iteration, the confirmation step 630 will not consider any of X those hypotheses again regardless of the confidence levels determined by the Recognition Engine. Conversely, if, during the first iteration of the cycle, the confirmation step 630 does not consider a hypothesis because the confidence level determined by the Recognition Engine falls within a low confidence interval (not high enough to be considered high confidence, but not low enough to be dismissed as "no hypothesis"), and that same hypothesis is identified again in the next iteration, the confirmation step 630 will consider that hypothesis.

Features that can be customized in Dialogue Module instances include disabling confirmation (in some cases, it is possible that a developer may choose to assume that the best hypothesis is always correct), enabling confirmation only under specified circumstances (such as if the confidence level for a given hypothesis is less than a predefined threshold), and enabling confirmation always. The prompt output by the confirming step may also be customized. For example, if a Dialogue Module instance is customized to determine the two best hypotheses for a caller's response, the confirmation step can be implemented to call a Yes/No Dialogue Module to determine whether the best hypothesis is correct, or may call a Menu Dialogue Module (explained below), which lists both hypotheses and asks the caller to select one.

Other features that can be customized for the Confirmation Step 630 include the recognition vocabulary to use and a rejection threshold setting a minimum level of confidence for a vocabulary entry to be considered as one of the n-best hypotheses. Again, as explained below, each of these features can generally be provided by default parameters, or may be customized by the developer.

4. Disambiguating the Confirmed Response

The disambiguation step of block 660 disambiguates the caller's response if the confirmed response corresponds to more than one correct match with vocabulary entries. For example, in the Service illustrated in FIG. 1, if the Company A ItemList vocabulary has two entries for employees named "Mike," the confirmation step 630 can determine when a caller to Company A asks to speak to "Mike" but cannot determine which of the two is requested by the caller. Thus, the Dialogue Modules also include a customizable disambiguation step 660 which, in this embodiment, outputs a customized prompt listing the possible entries and asking the caller to select one from the list.

5. Error Recovery

Dialogue Modules templates include error recovery methods which can be customized by a developer for specific instances in Services. For example, error recovery steps such as those represented by blocks 640 and 650 are executed after an unsuccessful attempt by a Dialogue Module instance to complete its dialogue task. For example, as shown in FIG. 6, the error recovery steps 640, 650 are executed when the Service does not collect a response from the caller during the timeout period as shown by path 620a or the Service is unable to confirm any hypothesis matching the caller's response as shown by path 630a.

As explained below, the error recovery process is customizable for specific instances of Dialogue Modules in a Service. For example, at block 640, a Dialogue Module determines whether to reattempt to collect a response using the same method 610 as represented by path 640a, or using a fallback method, represented by path 640b to block 650. Error recovery parameters that can be customized include the content of prompts 610 used for reattempts following path 640a and threshold retry numbers to determine when to retry following path 640a and when to resort to the fallback method 650 following path 640b. For example, the retry numbers can include a maximum number of consecutive timeouts following a prompt (following path 620a), a maximum number of consecutive errors in understanding a caller's responses to a specific prompt (following path 630a), and an overall maximum number of times the Dialogue Module instance will retry.

At the retry step of block 640, if the Dialogue Module determines that no threshold retry numbers have been reached, it will take path 640a to output another prompt to the caller at block 610. Common reprompts during a retry include two subcategories: apologies and reprompts. Apology prompts apologize for not completing its task, and may vary for different situations. For example, the apology prompt after a timeout may be, "I'm sorry, I didn't hear you," whereas the apology prompt after a recognition error may be, "I'm sorry for not understanding you." Similarly, the reprompts following the apology prompts may vary. The reprompt after a timeout apology prompt may say, "Please say your answer now," whereas the reprompt after a recognition error apology prompt may say, "Please repeat your answer now." Still other variations may be provided depending on the number and type of prior failures. For example, after a second consecutive timeout, the apology prompt may be, "I'm sorry, I still couldn't hear you," followed by the same reprompt, "Please say your answer now."

If the Dialogue Module determines that a threshold retry number is reached, it will follow path 640b to use a fallback method at block 650 to attempt to elicit a recognizable caller response. Examples of fallback methods include requesting the caller to spell his or her response or to enter DTMF tones using telephone touch-tone keys. For example, as illustrated in FIG. 5, a Dialogue Module instance can be customized to exit to a Spelling Module 550 after a threshold number of recognition errors.

6. Termination

A Dialogue Module instance terminates either successfully at block 670 or unsuccessfully at block 680 and saves its Termination Condition. For example, Termination Conditions may include SUCCESS (for successful completion of the dialogue task), TIMEOUT (for expiration of a threshold number of time out periods), and ERROR (for unsuccessful attempts to recognize a caller's response).

In this embodiment, Dialogue Modules record information about the execution of the Dialogue Module instance at termination, including, for example, occurrences of the various execution steps such as collection, confirmation, disambiguation, starts and completions of prompts, and starts and completions of caller response recognitions. Recorded information may include additional information such as the recorded waveforms of caller responses, timestamps, and the "n-best" recognition hypotheses and their confidence scores.

Logged recognition results and stored waveforms permit later analysis of the Service execution for uses such as trouble shooting, upgrading, and tuning. Additionally, such information can be used by Dialogue Module instances to improve completion rates by dynamically adjusting the semantic, language, and acoustic models used by the Speech Components 440, 450. These adjustments can be made at various levels. For example, adjustment can be made at a global level affecting the execution of Dialogue Module instances in all Services using the speech system. Adjustments can similarly be made at a caller level, affecting the execution Dialogue Module instances in Services interacting with a specified caller (identified by the Service Execution Environment using, for example, the calling telephone number, or by a Service using an identifier (such as an account number or user identification) for the caller).

Semantic adjustments are used by the Dialogue Modules to adapt recognition algorithms used by the Recognition Engine based on the meaning of a recognized caller response. For example, callers to an automated Service for making airline reservations typically request information regarding dates within a week or so of the calling date. A Dialogue Module instance for recognizing dates in such a Service can be implemented to consider the time interval within which dates recognized in prior calls fall, and to adjust the semantic models used by the Recognition Engine to take into account that the date spoken by a caller in a future call is likely to fall within the same time interval.

Language adjustments are made to adapt recognition algorithms used by the Recognition Engine using information based on recognition results of prior executions of a Dialogue Module instance. For example, for a Dialogue Module instance for recognizing city names, such information may include tracking calling telephone numbers, callers' pronunciations of city names and the correctly recognized city names corresponding to those pronunciations in prior executions of the Dialogue Module instance, and the relative frequency with which certain words of the recognized vocabulary are spoken in comparison to other words. Such information can indicate that a response sounding like "Wuhstuh" from a caller from the Boston area (identifiable by the calling telephone number) is likely to mean the city Worcester, while the same response from a caller from the Providence area is more likely to mean the city Wooster. This information can be used by the Dialogue Module instance to adapt the language model used by the Recognition Engine. For example, if prior recognitions show that the response sounding like "Wuhstuh" from callers from the Boston area are more likely to mean "Worcester" than "Wooster," the language model can be adapted to statistically weight the vocabulary entries "Worcester" and "Wooster" to indicate that "Worcester" is a more likely hypothesis than "Wooster" when the calling telephone number is from the Boston area.

Finally, acoustic adjustments can be made at the phoneme level to retrain the statistical acoustic models used by the Recognition Engine to associate specific sounds with the specific phonemes, based on information derived from the relationship between recognized phonemes and their corresponding pronunciations in received caller responses processed by the Dialogue Modules.

B. Examples of Dialogue Module Templates

Examples of individual Dialogue Modules (described with reference to FIG. 6) Conclude the following:

1. Yes/No: A Yes/No Module outputs an Initial Prompt and collects and determines whether a caller's response is affirmative or negative, based on a recognized vocabulary that includes a variety of responses as affirmative ("yes," "sure," "correct," "right," etc.) and as negative ("no", "incorrect," "wrong," etc.). The module saves a Termination Condition, and if successful, stores its result as, for example, a boolean value (0 for negative, 1 for affirmative).

The functionality of the Yes/No Module can be used within other Dialogue Modules. For example, as shown in FIG. 5, the ItemList Dialogue Module may be implemented to provide the functions of the Yes/No Module in performing its Confirmation step 523.

2. Spelling: The Spelling Module outputs an Initial Prompt and collects one or more alphanumeric characters (including symbols) as the caller's response. In one embodiment, the module uses a specified vocabulary of entries to be recognized, and searches the vocabulary for matching entries as each character is spelled by the caller. As noted above, using the look-ahead feature provides early identification of spelled words and phrases. In an alternative embodiment, the module can use a specified vocabulary of individual characters, eventually identifying a character string corresponding to the spelling from the caller. Upon completion, the module saves a Termination Condition and if successful, stores its result in an appropriate format such as a data object or a character string.

As with the Yes/No Module, the functionality of the Spelling Module can be used within other Dialogue Modules. For example, as shown in FIG. 5, the ItemList Dialogue Module may be implemented to provide the functions of the Spelling Module in performing its fallback method 522.

3. Formatted Codes: A variety of module templates can be provided to recognize codes having specific formats, such as telephone numbers, addresses, zip codes, dates, times, currency amounts, account numbers, and social security numbers. These modules incorporate recognized grammars and use recognized vocabularies having entries corresponding to available response matching the format of the required code. Upon completion, the module returns a Termination Condition and if successful, stores its result as, for example, a data object or a character string.

4. Menu: The Menu Module outputs an initial prompt asking a caller to select from a series of listed options, collects the caller's response, and attempts to match the response with at least one entry of a recognized vocabulary corresponding to the listed options. Upon completion, the module returns a Termination Condition and if successful, stores its result as, for example, a data object or a character string.

5. ItemList: The ItemList Module lets a developer define a list of words or items as allowable responses to a caller prompt. In general, the initial prompt of this module does not constrain the caller's response (as does the Menu Module). For example, the ItemList Module in the Service of FIGS. 1 and 2 asks the caller to say the name of a person, without limiting the caller to specific responses. Such a module uses a recognized vocabulary including entries corresponding to recognized items. Upon completion, the module returns a Termination Condition and if successful, stores its result as, for example, a data object or a character string.

III. Creating A Customized Service

Referring again to FIG. 4, a Service 410 may be implemented and integrated with Dialogue Modules 430 in several ways. For example, Service 410 can be configured as a "main" function in a third-generation programming language such as C, in which the Dialogue Modules 430 are called using C language function calls arranged in the call flow order. In this configuration, the "main" function can be a stand-alone program. Alternatively, as described above, the Service 410 may be configured as a dynamically linked library (dll) that is linked to a Service Execution Environment 420 when the Service 410 is initialized. In this configuration, the Service 410 acts as a function library. The Service Execution Environment 420 executes one or more functions in the Service 410, which in turn call the Dialog Modules 430.

A. User Interfaces

Various user interfaces may be provided to allow different methods of creating the Service. For example, a non-graphic application programming interface may allow a developer to create the Service using traditional programming methods. Alternatively, graphical user interfaces (GUIs) may be used. For example, the GUI 700 illustrated in FIG. 7 includes a stencil palette 710 having icons representing States (such as wait for call and transfer call) 720 and Dialogue Module templates 730, allowing the developer to structure the call flow of the Service by creating states and instances of Dialogue Modules by "dragging and dropping" the appropriate icons into the main workspace 740. The GUI 700 also includes a variety of connectors to link states and templates in the appropriate order and specifying appropriate conditions. In the embodiment shown, the stencil palette 710 is displayed along the left margin of the GUI window 700 and the various connector types are available in the pull-down menu 750. The Service icons are displayed in the main workspace 740 of the window.

To insert a state or Dialogue Module instance in the Service, a developer selects the appropriate icon from the stencil palette 710 and drops it into the main workspace 740, where it is displayed with the state or template name beneath the icon and the instance name above the icon. Initially, the GUI 700 automatically assigns a descriptive generic name to the instance, such as Instance #1. The developer can rename the instance by selecting and editing the text.

The menu bar 750 includes a "Connectors" option, which provides connector types to connect icons in the main workspace 740 in accordance with the desired callflow of the Service. Various connectors are provided. For example, an unconditional connector, represented in the main workspace 740 by a solid line, connecting a first and second icon indicates that the Service always proceeds to the second icon upon completion of the first. A conditional connector, represented in the main workspace 740 by a broken line, indicates that the Service proceeds to the second icon only if a condition is satisfied.

B. Customizing Dialogue Modules Instances in a Service

As explained above with reference to FIG. 4, each Dialogue Module instance is based on a Dialogue Module template for accomplishing a discrete dialogue task and can be modified for specific Services. The relationship between a Service 410 and the Dialogue Modules 430, including both templates and instances, is illustrated in greater detail in FIG. 8.

1. Dialogue Module Templates

The Dialogue Module Templates 810 include configuration libraries which define the behavior of the Dialogue Module instances 850 used in a Service 840. The configuration libraries include a "Baseline" configuration library 820 of default settings, including standard default parameters, prompt files, recognized vocabularies, header functions, and templates for the various dialogue tasks performed by the Dialogue Modules. A developer can customize the baseline configuration settings by providing an optional "System" configuration library 830, providing settings that override the default settings of the Baseline Library 820. The System Library 830 can provide override settings for any portion or all of the default settings.

2. Dialogue Module Instances in a Service

Figure 8:
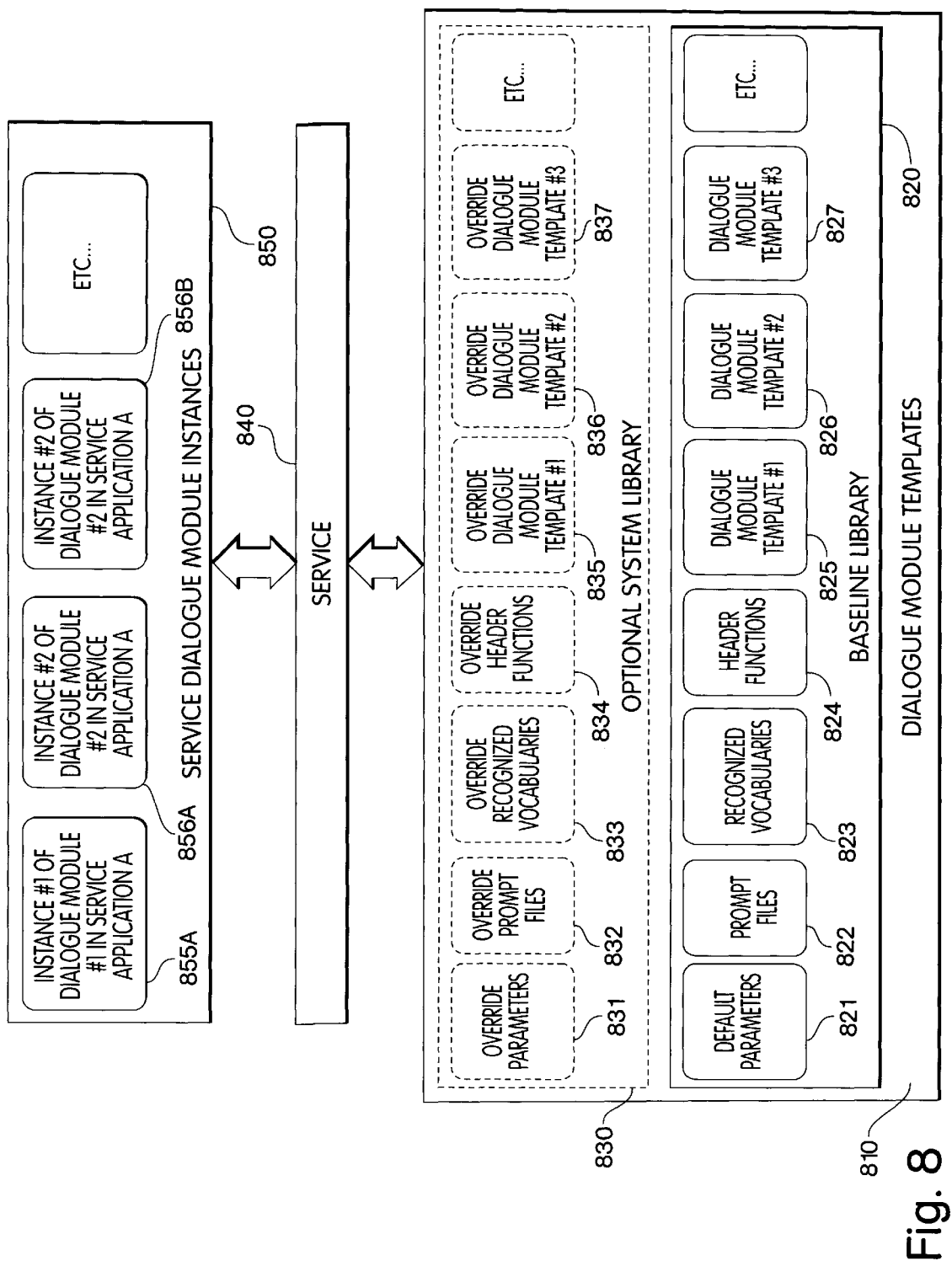
FIG. 8 is a logical representation of an interactive speech application using Dialogue Modules.

A developer can further customize a service by customizing the Dialogue Module Instances 850 in a Service 840. As noted above, each call within a service to a specified Dialogue Module is implemented by creating a separate "instance" of the corresponding Dialogue Module template and identifying each instance with a unique name. This enables Dialogue Module instances of the same template to be customized differently within a single Service. For example, as shown in FIG. 8, the Service 840 makes two separate calls to Dialogue Module #2, represented by two separate instances 856A and 856B of the Dialogue Module templates 836, 826, which are based on the System Library settings 830 and any default Baseline Library settings 820 not overridden by the System Library 830.

The templates for the various Dialogue Modules share similarities, as illustrated by the above discussion with reference to FIG. 6. These basic similarities allow customizable features common to multiple Dialogue Modules to be defined, including output prompts, parameters for recognition features such as the number of recognition candidates to consider, recognized vocabularies, and error recovery parameters.

Features can be customized during development or execution of a Service. For example, a developer can customize the features of a Service using text-based configuration files, which allows the developer to change the parameters (and behavior during execution) of the Service without having to recompile the Service. Alternatively, features can be customized through runtime application programming interfaces contained within the Dialogue Modules. In embodiments integrated within a graphical development environment, a Graphical User Interface (GUI) can be provided to allow a developer to configure the Dialogue Modules by, for example, checking boxes or inserting text.

Figure 7:
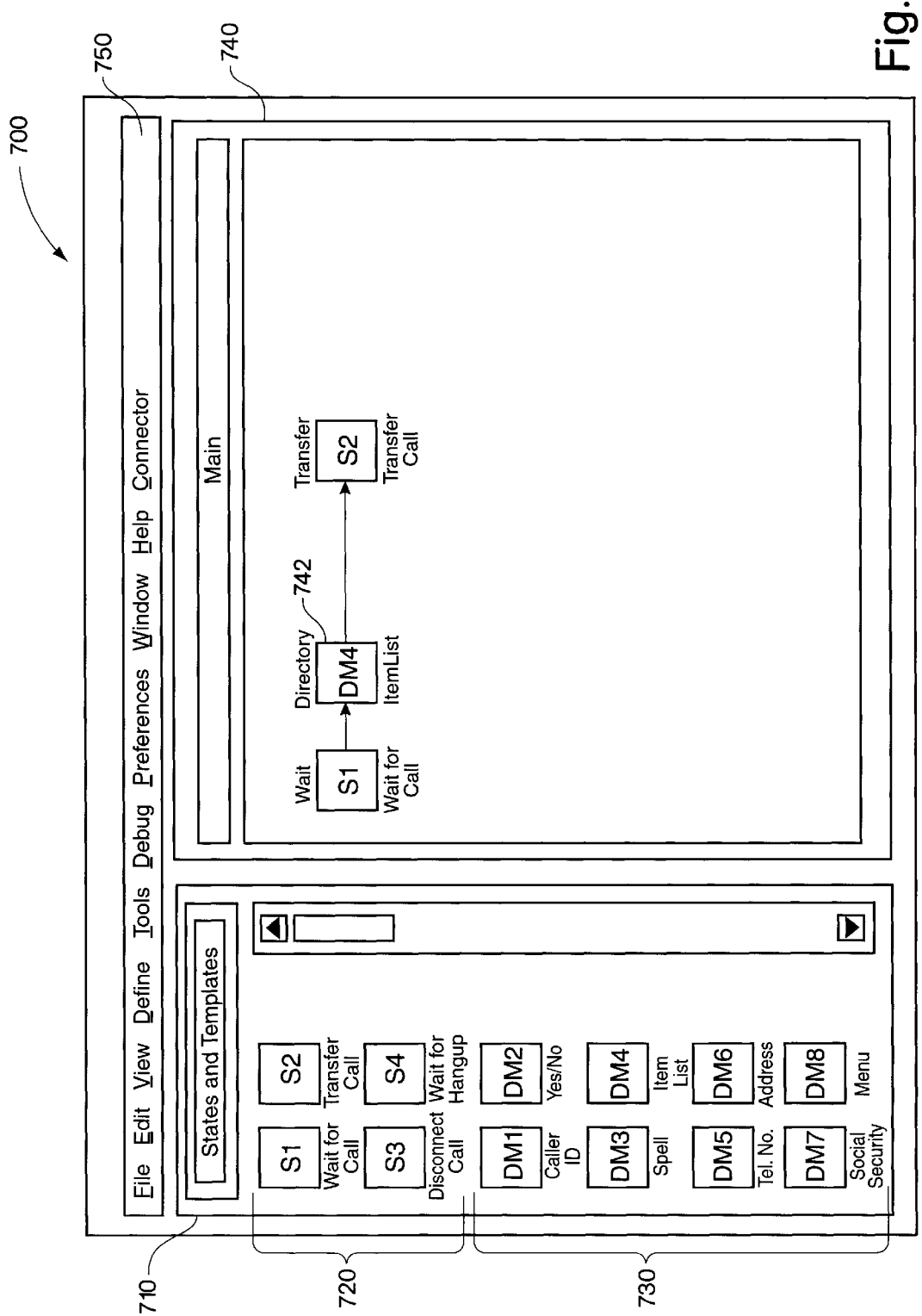
FIG. 7 illustrates a Graphical User Interface (GUI) for creating and editing an interactive speech application.
Figure 9:
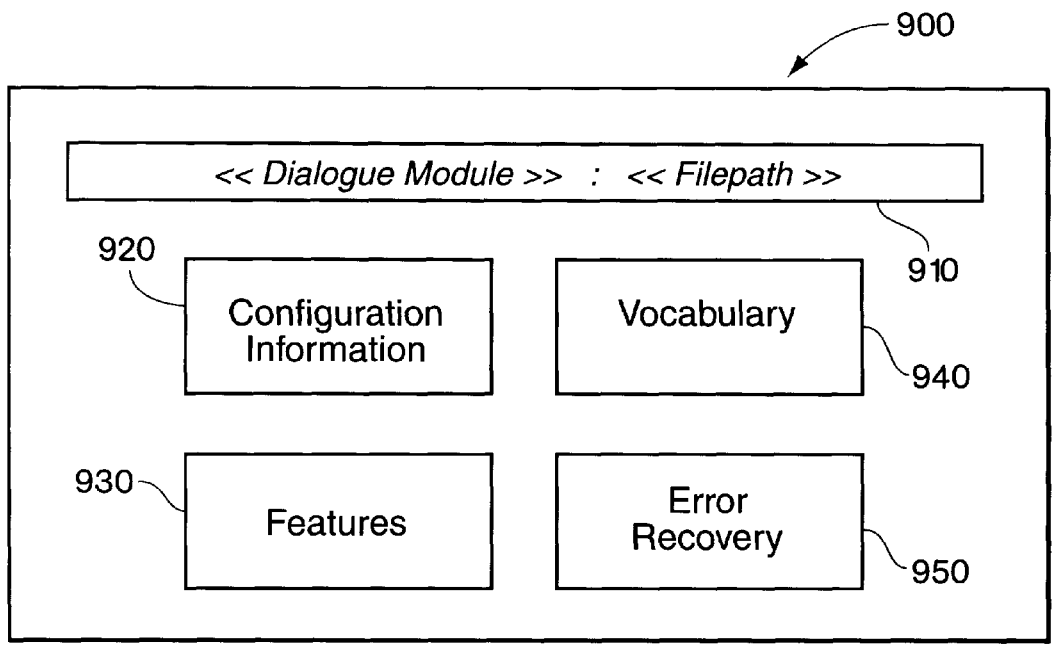

For example, using the GUI 700 of FIG. 7, a Dialogue Module instance can be customized by selecting an icon such as the Directory Module 742 in the main workspace 740, which opens a dialogue window 900 such as that shown in FIG. 9. This window 900 displays the name of the Dialogue Module instance 910 and provides four selections: Configuration Information 920, which allows the developer to view and modify the configuration information for the instance based on the information provided in the Baseline 820 and System 830 Libraries of the Dialogue Module Templates 810; Features 930, which allows the developer to customize various features for the instance; Vocabulary 940, which allows the developer to view, create, and edit recognized vocabulary for the instance; and Error Recovery 950, which allows the developer to view and modify the error recovery parameters for the instance.

a. Configuration Information

Figure 10:
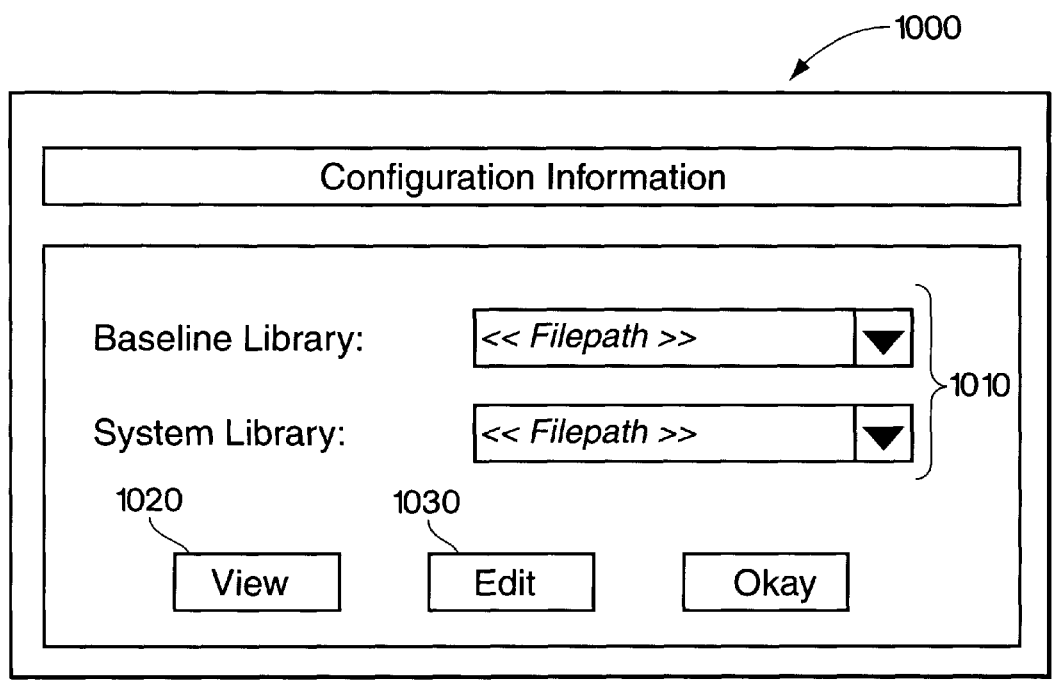

Selecting Configuration Information 920 from the window 900 of FIG. 9 causes a new dialogue window 1000 such as that illustrated in FIG. 10 to be displayed. Window 1000 displays the filepaths of the Baseline 820 and System 830 Libraries providing the configuration information for the Dialogue Module Instance 850. If more than one Baseline 820 and/or System 830 Library may be used, the window 1000 allows a developer to identify the desired Library in boxes 1010. The content of the configuration libraries may be viewed and or edited by selecting the View 1020 and Edit 1030 options.

b. Features

Figure 11:
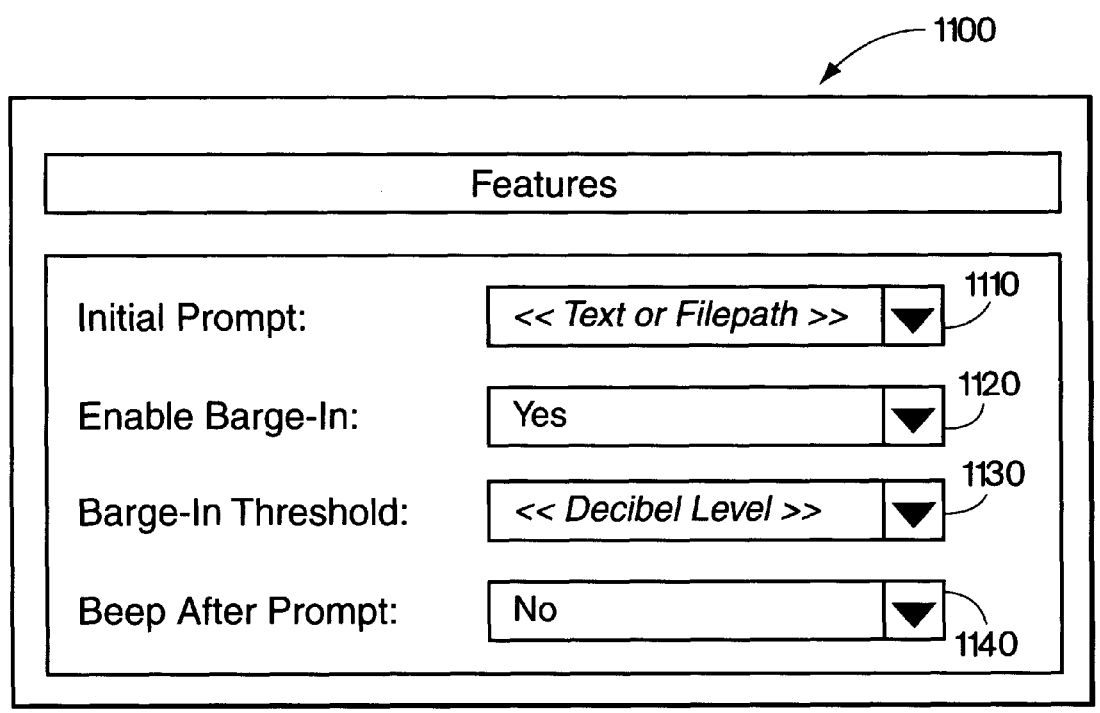

Selecting Features 930 from the window of FIG. 9 opens a window such as that illustrated in FIG. 11, displaying information about the various features that may be enabled in a specified Dialogue Module instance 850. The features shown in FIG. 11 include an initial prompt, whether to enable "barge-in" handling, setting a barge-in threshold (how loud the caller must speak to enable barge-in handling), and whether to enable Beep After Prompt (playing a beep after the prompt to signal caller to speak). Parameters for these features are initially set based on configuration information provided in the Baseline 820 and System 830 Libraries, but may be overridden by parameters entered by a developer in boxes 1110–1040.

Box 1110 is provided to specify the initial prompt for the Dialogue Module instance. As shown in FIG. 6, a Dialogue Module generally includes one or more prompts to callers during its callflow. In general, prompts used by the Dialogue Module templates and instances are referred to as "prompt objects," which are data objects stored as either audio, or if used in a system having speech components that can synthesize speech from text, as text files. In this embodiment, the initial output prompt may be specified by the file path of a stored prompt object, or by text, to be converted upon execution by a text-to-speech synthesizer. Some Dialogue Module templates may provide a default initial prompt. For example, the Yes/No Module template might have a default initial prompt of "Please say yes or no." In other cases, a Dialogue Module template may require that the developer provide a custom initial prompt.

c. Vocabularies

Selecting the Vocabulary option 940 from the window 900 of FIG. 9 allows a developer to customize the recognized vocabulary defining valid response to a Dialogue Module prompt. Some Dialogue Modules, such as the Yes/No Module, can use a completely defined default vocabulary, although such vocabularies may be customized or substituted by the developer. Other Dialogue Modules, such as the ItemList Module, while they may be used with a general standard vocabulary, are more suited for customized vocabularies.

Figure 12:
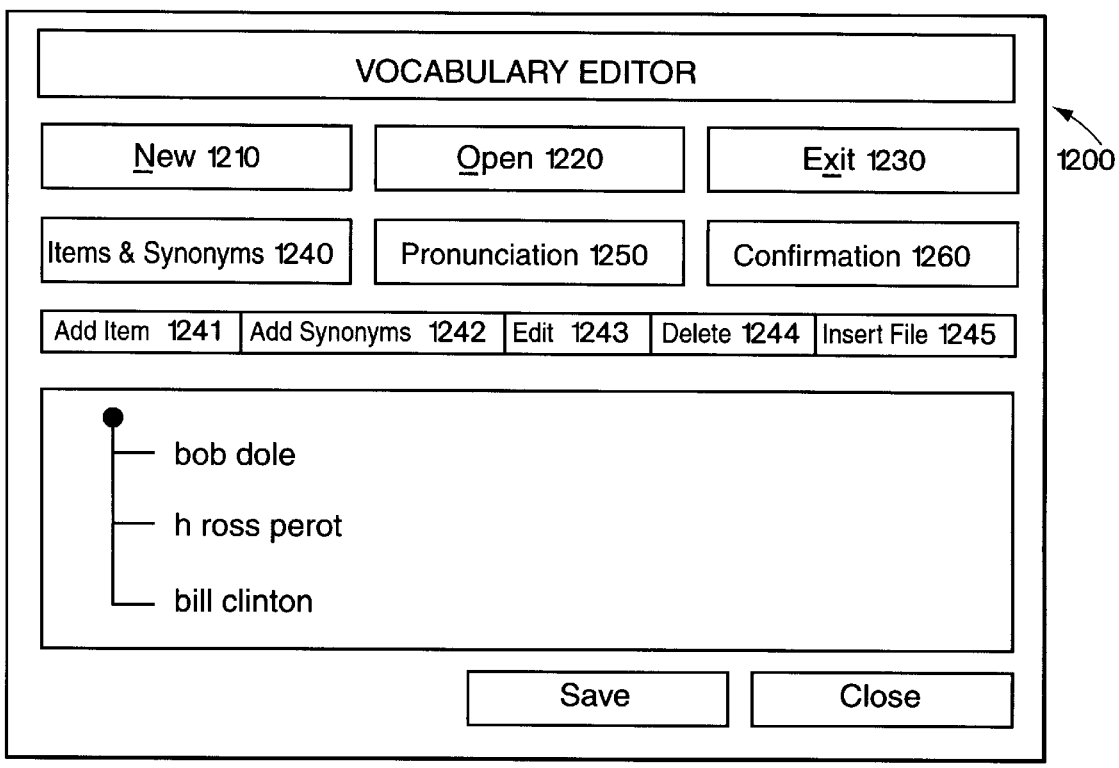

In this embodiment, selecting the Vocabulary option 940 opens a window 1200 such as that shown in FIG. 12. FIG. 12 shows a vocabulary editor, which is a tool for customizing vocabularies for Dialogue Module instances. An example of an appropriate editor is the Vocabulary Editor, available in SpeechWorks™, commercially available from Applied Language Technologies, Inc. of Boston, Mass. The SpeechWorks™ Vocabulary Editor allows a developer to create or modify a recognized vocabulary, defining a list of terms that will be recognized in response to a prompt. The initial window 1200 shown in FIG. 12 includes menu options to create a new vocabulary file 1210, open an existing file 1220, or exit 1230. For any opened file, the Editor provides three menu options: Items & Synonyms 1240, to edit the items and synonyms recognized; Pronunciations 1250, to edit pronunciations of items and synonyms recognized; and Confirmation 1260, to customize confirmation settings for the vocabulary file.

FIG. 12 shows the display when the Items & Synonyms option 1240 is selected, providing options 1241–1245 for editing items and synonyms of the vocabulary. In this embodiment, "items" are the recognized items of a vocabulary, and "synonyms" of an item are alternative terms which the Dialogue Module will recognize as matches for that item. FIG. 12 shows three items, "bob dole," "h ross perot," and "bill clinton."

Using a GUI such as that illustrated in FIG. 12 provides option 1241 to allow a developer to add new terms as items, option 1242 to add synonyms for recognized terms, option 1243 to edit existing items and synonyms, option 1244 to delete existing items and synonyms, and option 1245 to insert another vocabulary file. Highlighting an existing item and adding a synonym allows the developer to add terms which the Dialogue Module instance should recognize as matching that item. For example, a synonym "clinton" could be added for the item "bill clinton." This could be displayed by listing synonyms under their items at an indented tier.

Figure 13:
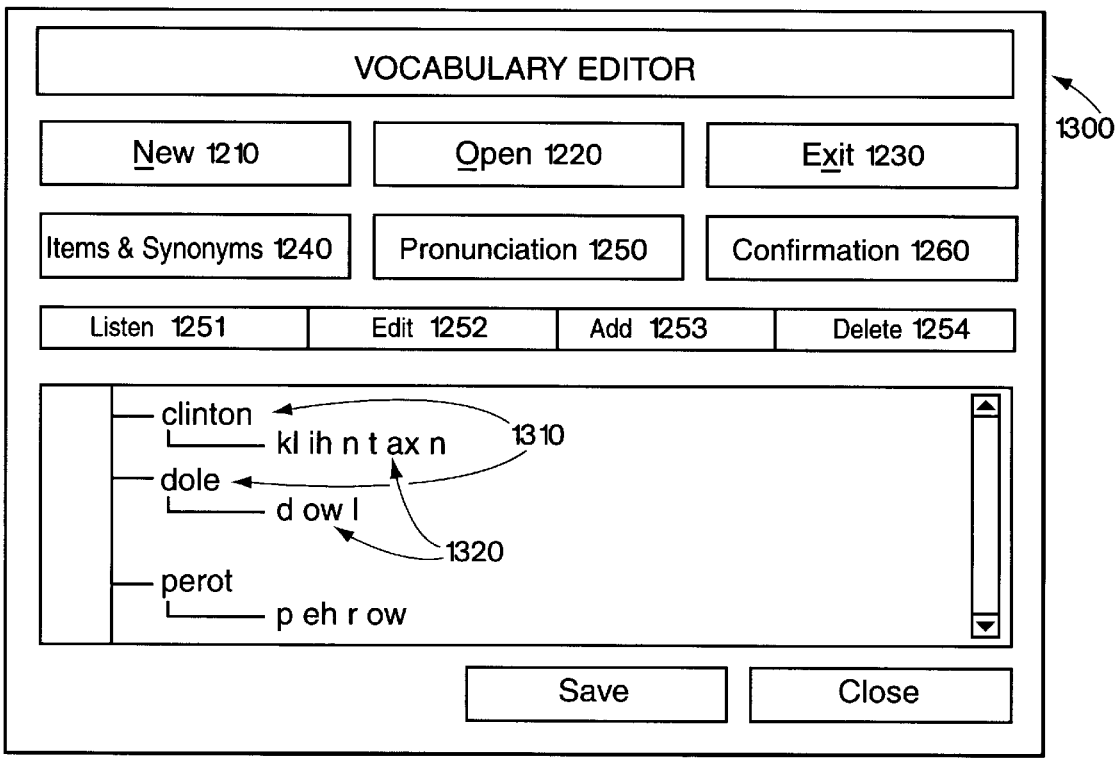

Selecting the Pronunciation option 1250 opens a window 1300 such as that shown in FIG. 13. In the embodiment shown, the Vocabulary Editor determines pronunciations for items and synonyms using a predefined system dictionary that provides pronunciations of frequently used words in the language to be recognized, a user dictionary that includes user-defined pronunciations for specified words, and fall back rules, which are phonetic rules for generating pronunciations based on a word's spelling.

The window 1300 in FIG. 13 shows each word 1310 of the items and synonyms from a vocabulary on the left, followed on the next line by a pronunciation 1320. In this embodiment the pronunciations are highlighted in a color reflecting its source. For example, a pronunciation from the system dictionary may be highlighted in white, a pronunciation from a user dictionary may be highlighted in light blue, a pronunciation edited by the user may be highlighted in darker blue, and a pronunciation generated from the phonetic rules may be highlighted in red.

Figure 14:
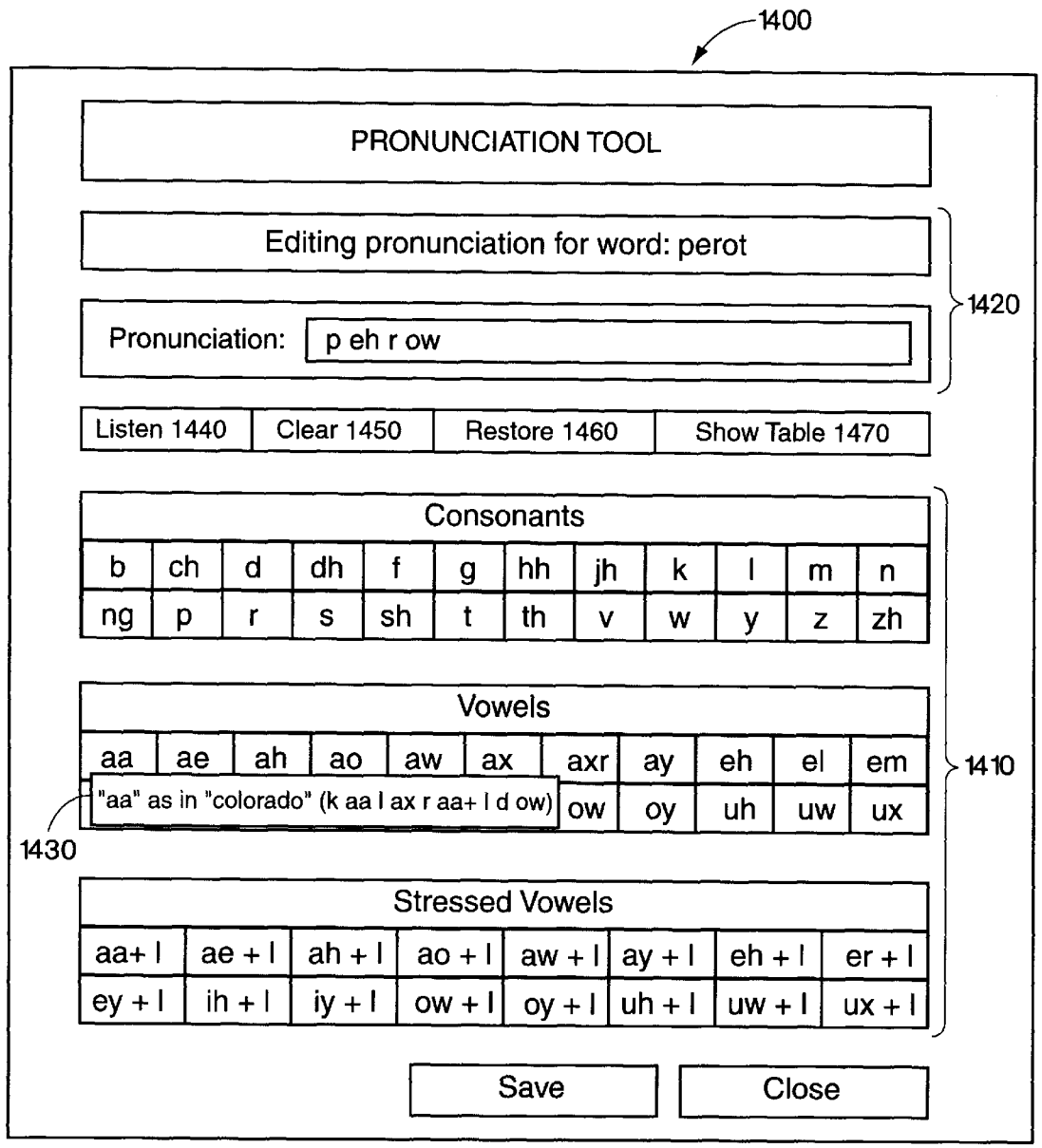

As shown, the menu options 1251–1254 allow a developer to listen to the pronunciation of any of the items (or synonyms), edit the pronunciations, add alternative pronunciations, and delete pronunciations. Selecting a item (or synonym) followed by the Edit option 1252 or Add option 1253 opens a window 1400 such as that shown in FIG. 14, displaying a phonetic keyboard 1410 and the selected entry 1420 for which a pronunciation is to be edited or added. Each key of the phonetic keyboard 1410 represents a phoneme. Holding the cursor over a key causes a pop-up box 1430 to open, providing an example of the pronunciation of the corresponding phoneme's sound by displaying a commonly used word that includes that phoneme. The developer can also retrieve this information by selecting the "Show Table" option 1470, which will display the table of all available phonemes and a commonly used word illustrating their pronunciation.

To modify or add to the pronunciation for the selected item or synonym, a developer selects keys to insert the corresponding phonemes into the pronunciation. The Listen option 1440 allows a developer to hear the pronunciation of the phonemes shown in the Pronunciation box 1420 to aid the developer's verification and modification of a pronunciation.

Figure 15:
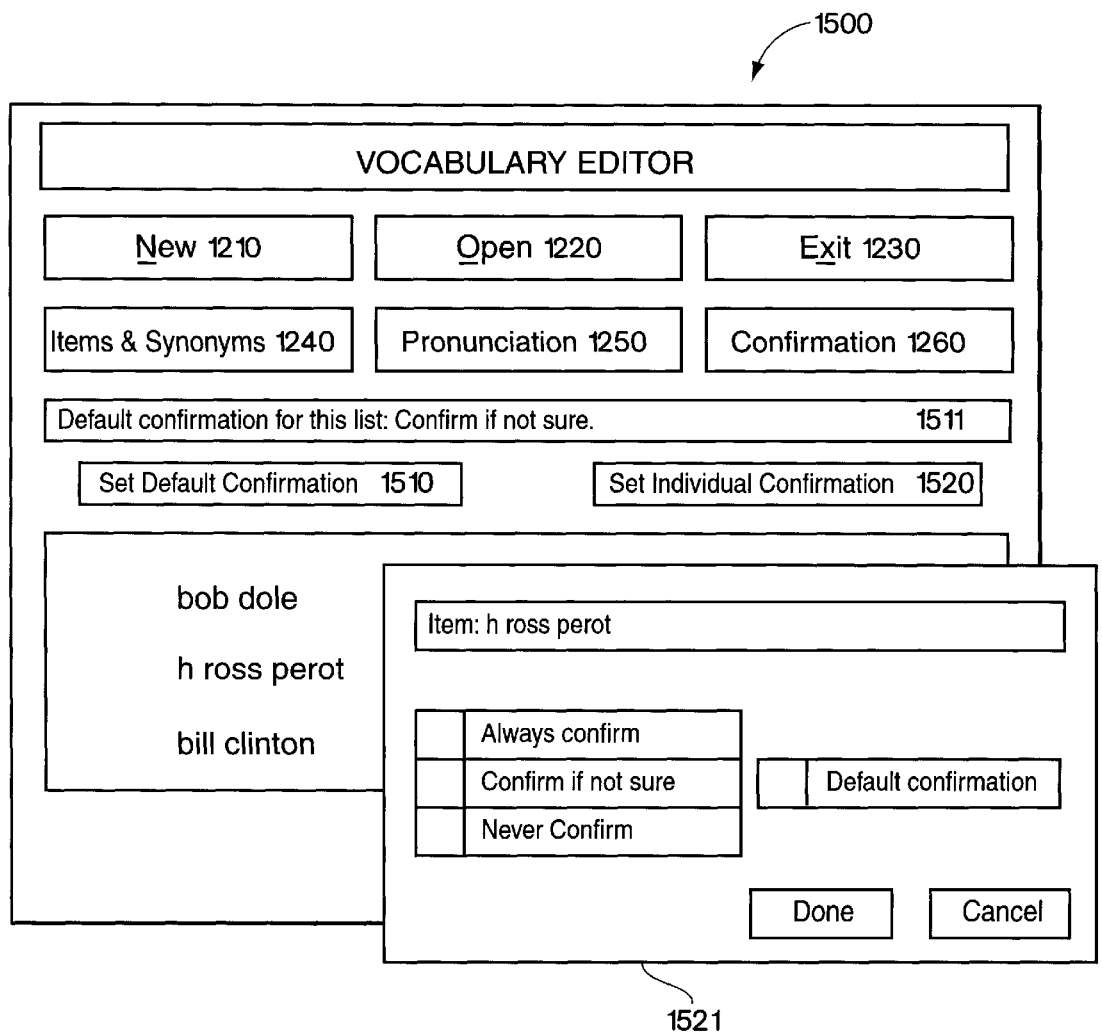

Referring back to FIG. 12, the Vocabulary Editor also provides a "Confirmation" option 1260. Selecting this option opens a window 1500 such as that illustrated in FIG. 15. As noted above, Dialogue Module instances can be implemented to confirm its hypothesis of a caller's response. The Confirmation window 1500 of the Vocabulary Editor provides an option 1510 to allow a developer to set a default parameter for determining when items and synonyms from a specified vocabulary are confirmed, which is displayed in box 1511. The Confirmation window 1500 also provides an option 1520 to allow a developer to set confirmation parameters for individual items and synonyms of the vocabulary, which when selected, opens a window 1521 for the individual item or synonym, along with the available confirmation options.

d. Error Recovery Parameters

Selecting the Error Recovery option 950 from the window 900 of FIG. 9 opens a window 1600 such as that illustrated in FIG. 16, which allows a developer to customize the error recovery parameters to determine the call flow within a Dialogue Module instance. As noted above with reference to FIG. 6 and as shown in FIG. 16, error recovery parameters that can be customized include the timeout period, the maximum number of times a Dialogue Module will allow consecutive timeouts, the maximum number of times the Dialogue Module will allow consecutive recognition errors in understanding a caller's responses to a specific prompt, confirmation options, and fallback options. Default values for these parameters are initially provided by configuration information in the Baseline 820 and System 830 Libraries, and may be customized for specific instances of Dialogue Modules using the GUI such as the window 1600 of FIG. 16.

Other error recovery parameters include the content of apology prompts and reprompts. FIG. 8 shows a set of prompt files 822, 832 stored in the Baseline 820 and System 830 Libraries. Such files include files in the appropriate format for standard prompts such as timeout apology prompts, error apology prompts, reprompts, and success messages. Customized prompts can also be provided in the prompt files, or stored elsewhere where they may be accessed within Dialogue Module instances.

As noted above, a variety of prompt may be provided in addition to the initial prompt, including, for example, a first and second timeout apology prompt, a first and second error apology prompt, as well as general reprompt prompts. The configuration data for Dialogue Module Templates 810 provided by the Baseline 820 and System 830 Libraries may include default prompts including a first timeout apology prompt of "I'm sorry, I didn't hear your response" and a second timeout apology prompt of "I'm sorry, I still couldn't hear your response," a first error apology prompt of "I'm sorry, I didn't understand what you said" and a second error apology prompt of "I'm sorry. I'm still having difficulty understanding you." The default prompts may also include a first general reprompt of "Please say your answer C now," a second general reprompt of "Please say your answer again," and a default success prompt of "Thank you."

As noted above, the prompts may be specified in any appropriate format. For example, some embodiments may allow the prompt to be specified by its filepath, by a given name (for example, if named and stored in the Prompt Files 822, 832 shown in FIG. 8), or if a text-to-speech synthesizer is used, by its text.

Some templates, such as the ItemList Module template, require the developer to create at least some of the prompts, using an appropriate Service to create and save the prompts so that they can be properly output to callers. For example to customize an existing prompt, a developer can open the prompt file in an appropriate Service and modify the prompt. To provide a new prompt, the developer can create a new prompt file and identify its filepath to Dialogue Module instances that output that prompt. Alternatively, in systems using text-to-speech synthesizers, a developer can simply provide the text of the prompt to a Dialogue Module instance.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method of constructing, by a developer, an interactive speech application for use by an application user, the method comprising:
   providing a plurality of dialogue modules, wherein each dialogue module includes computer readable instructions for accomplishing a predefined interactive dialogue task;
   selecting, in response to developer input, at least one of the plurality of dialogue modules to accomplish at least one respective interactive dialogue task; and
   establishing, in response to developer input, at least one relationship between the at least one dialogue module and a dialogue-processing unit other than the at least one dialogue module to define a flow of dialogue between the application user and the interactive speech application.

2. The method of claim 1, further comprising:
   setting, in response to developer input, at least one configuration parameter associated with at least one of the dialogue modules, wherein each configuration parameter affects how an associated dialogue module operates when the interactive speech application executes.

3. The method of claim 2, wherein an interactive dialogue task associated with a dialogue module includes outputting a prompt to the application user and receiving a response from the application user, and at least one of the at least one configuration parameters is a timeout parameter defining a period of time for the application user to respond after a prompt is output.

4. The method of claim 2, wherein an interactive dialogue task associated with a dialogue module includes outputting a prompt to the application user and receiving a response from the application user, and at least one of the at least one configuration parameter is a prompt parameter defining a prompt to be output.

5. The method of claim 2, wherein an interactive dialogue task associated with a dialogue module includes outputting a prompt to the application user and receiving a response from the application user, and at least one of the at least one configuration parameters is an apology prompt parameter for defining an apology prompt to be output if the application user's response is not recognized.

6. The method of claim 2, wherein an interactive dialogue task associated with a dialogue module includes outputting a prompt to the application user and receiving a response from the application user, and at least one of the at least one configuration parameters is a parameter for designating recognizable responses from the application user.

7. The method of claim 1, further comprising storing the selected at least one dialogue module and an indication of the at least one relationship.

8. The method of claim 1, wherein an interactive dialogue task associated with a dialogue module includes:
   instructions for outputting a prompt to the application user;
   instructions for receiving a response from the application user; and
   instructions for interacting with a speech recognition engine for recognizing the received response using recognition models.

9. The method of claim 8, wherein an interactive dialogue task associated with a dialogue module further includes instructions for updating the recognition models used by the speech recognition engine based on recognized responses during execution of the interactive speech application.

10. The method of claim 1, further comprising:
    graphically representing the plurality of dialogue modules as icons in a graphical display, wherein:
    the selecting includes receiving an indication of the at least one dialogue module; and
    the establishing includes graphically interconnecting the icon representing the at least one dialogue module with a graphical indication representing the other dialogue-processing unit according to the at least one relationship.

11. The method of claim 10, further comprising:
    displaying a window in the graphical display for setting a value of a configuration parameter when an icon for a dialogue module having an associated configuration parameter is selected in response to developer input; and
    setting the value of the configuration parameter in response to developer input;
    wherein the configuration parameter affects how a dialogue module operates when the interactive speech application executes.

12. The method of claim 1 wherein the selecting includes selecting at least two dialogue modules.

13. The method of claim 12 wherein the another dialogue-processing unit is a selected dialogue module.

14. The method of claim 13 wherein the selecting includes selecting at least two different dialogue modules and the another dialogue-processing unit is different from the selected dialogue module with which the another dialogue-processing unit has a relationship established.

15. A memory device storing computer-readable instructions for enabling a developer to construct an interactive speech application in a speech processing system, the instructions being for causing a computer to:
    perform a plurality of predefined interactive dialogue tasks, at least the instructions associated with the tasks forming a respective plurality of dialogue module templates;
    produce, in response to developer input, a plurality of dialogue module instances for use in an interactive speech application, wherein each dialogue module instance is based on, and is a customized version of, one of the dialogue module templates, the dialogue module templates and the dialogue module instances being forms of dialogue modules; and
    establish, in response to developer input, at least one relationship between at least two dialogue modules to define a dialogue flow.

16. The memory device of claim 15, further comprising instructions for causing a computer to:
    set, in response to developer input, a value of at least one configuration parameter associated with at least one of the dialogue modules, wherein each configuration parameter affects how an associated dialogue module operates when the interactive speech application executes.

17. The memory device of claim 16, wherein an interactive dialogue task associated with a dialogue module includes outputting a prompt to the application user and receiving a response from the application user, and at least one of the at least one configuration parameter is a parameter for designating recognizable responses from the application user.

18. The memory device of claim 15, further comprising instructions for causing a computer to store the at least two dialogue modules and an indication of the relationship between the at least two dialogue modules.

19. The memory device of claim 15, wherein an interactive dialogue task associated with a dialogue module includes instructions for causing a computer to:

output a prompt to the application user;

receive a response from the application user; and interact with a speech recognition engine for recognizing the received response using recognition modules.

20. The memory device of claim 19, wherein an interactive dialogue task associated with a dialogue module further includes instructions for causing a computer to update the recognition models used by the speech recognition engine based on recognized responses during execution of the interactive speech application.

21. The memory device of claim 15, further comprising:

instructions for causing a computer to graphically represent the plurality of dialogue modules as icons in a graphical display, wherein:

the instructions for causing a computer to produce the dialogue module instances include instructions for causing a computer to select the plurality of dialogue modules templates in response to developer input and instructions for causing a computer to graphically represent the dialogue module instances as icons in the graphical display; and the instructions for causing a computer to establish at least one relationship between at least two dialogue modules include instructions for causing a computer to graphically interconnect the icons representing the dialogue modules into a graphical representation of the dialogue flow of the interactive speech application in accordance with the at least one relationship.

22. A computer program product, residing on a computer-readable medium, for enabling a speech-application developer to construct an interactive speech application for use by an application user, the computer program product comprising instructions for causing a computer to:

provide a plurality of dialogue modules, each dialogue module including computer-readable instructions for causing a computer to accomplish a predefined interactive dialogue task;

select, in response to developer input, at least one of the plurality of dialogue modules to accomplish at least one respective interactive dialogue task; and establish, in response to developer input, at least one relationship between the at least one dialogue module and a dialogue-processing unit other than the at least one dialogue module to define a flow of dialogue between the application user and the interactive speech application.

23. The computer program product of claim 22 wherein the instructions for causing a computer to select include instructions for causing a computer to select, in response to developer input, at least two dialogue modules.

24. The computer program product of claim 23 wherein the another dialogue-processing unit is a selected dialogue module.

25. The computer program product of claim 22 further comprising instructions for causing a computer to store the selected at least one dialogue module and an indication of the at least one relationship.

* * * * *